US008570395B2

(12) United States Patent
Egawa

(10) Patent No.: US 8,570,395 B2
(45) Date of Patent: Oct. 29, 2013

(54) SOLID-STATE IMAGING DEVICE

(71) Applicant: Kabushiki Kaisha Toshiba, Minato-ku (JP)

(72) Inventor: Yoshitaka Egawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/850,208

(22) Filed: Mar. 25, 2013

(65) Prior Publication Data
US 2013/0208137 A1 Aug. 15, 2013

Related U.S. Application Data

(62) Division of application No. 12/849,345, filed on Aug. 3, 2010, now Pat. No. 8,456,540.

(30) Foreign Application Priority Data

Oct. 26, 2009 (JP) ................. 2009-245847

(51) Int. Cl.
*H04N 5/228* (2006.01)
*H04N 9/73* (2006.01)
*H04N 5/217* (2011.01)
*H04N 3/14* (2006.01)
*H04N 5/335* (2011.01)

(52) U.S. Cl.
USPC .............. 348/226.1; 348/222.1; 348/228.1; 348/241; 348/294; 348/297

(58) Field of Classification Search
USPC .......... 348/207.99, 222.1, 226.1–230.1, 241, 348/248–249, 294–324; 250/208.1
See application file for complete search history.

(56) References Cited

U.S. PATENT DOCUMENTS

| 6,507,365 | B1 | 1/2003 | Nakamura et al. |
| 6,710,818 | B1 | 3/2004 | Kasahara et al. |
| 7,209,169 | B2 | 4/2007 | Matsumoto et al. |
| 7,656,436 | B2 | 2/2010 | Kinoshita et al. |
| 2002/0154225 | A1 | 10/2002 | Matsumoto et al. |

(Continued)

FOREIGN PATENT DOCUMENTS

| JP | 2003-18458 | 1/2003 |
| JP | 2003-319204 | 11/2003 |

(Continued)

OTHER PUBLICATIONS

Office Action issued Jul. 2, 2013 in Japanese Application No. 2009-245847 (With English Translation).

(Continued)

*Primary Examiner* — Michael Osinski
(74) *Attorney, Agent, or Firm* — Oblon, Spivak, McClelland, Maier & Neustadt, L.L.P.

(57) ABSTRACT

According to one embodiment, a solid-state imaging device includes a pixel unit, a flicker detecting unit, a flicker-level estimating unit, and a flicker correcting unit. The flicker detecting unit detects, based on a magnitude relation of a signal amount in each of lines formed in the pixel unit, presence or absence of a flicker. The flicker-level estimating unit estimates a flicker level in each of the lines of the next frame. The flicker correcting unit corrects, for each of the lines, a flicker that occurs in a signal of an image picked up by the pixel unit.

13 Claims, 23 Drawing Sheets

(56) References Cited

U.S. PATENT DOCUMENTS

| | | |
|---|---|---|
| 2003/0030744 A1 | 2/2003 | Baer |
| 2003/0142239 A1 | 7/2003 | Yoshida et al. |
| 2004/0080630 A1 | 4/2004 | Kim |
| 2004/0109069 A1 | 6/2004 | Kaplinsky et al. |
| 2004/0165084 A1 | 8/2004 | Yamamoto et al. |
| 2004/0179114 A1 | 9/2004 | Silsby et al. |
| 2006/0055823 A1 | 3/2006 | Kinoshita et al. |
| 2007/0052816 A1 | 3/2007 | Nomura et al. |
| 2007/0153094 A1 | 7/2007 | Noyes et al. |
| 2008/0303920 A1 | 12/2008 | Kinoshita |
| 2009/0051782 A1* | 2/2009 | Ono et al. .................. 348/226.1 |
| 2009/0122155 A1 | 5/2009 | Kishi et al. |
| 2009/0135276 A1 | 5/2009 | Urisaka |
| 2009/0303365 A1 | 12/2009 | Watanabe |
| 2010/0053369 A1 | 3/2010 | Nagai |
| 2012/0236175 A1* | 9/2012 | Kinrot ........................ 348/226.1 |

FOREIGN PATENT DOCUMENTS

| | | |
|---|---|---|
| JP | 2004-048616 | 2/2004 |
| JP | 2004-222228 | 8/2004 |
| JP | 2007-215062 | 8/2007 |

OTHER PUBLICATIONS

Office Action issued in corresponding Japanese Application No. 2009-245847 on Jan. 8, 2013.

* cited by examiner

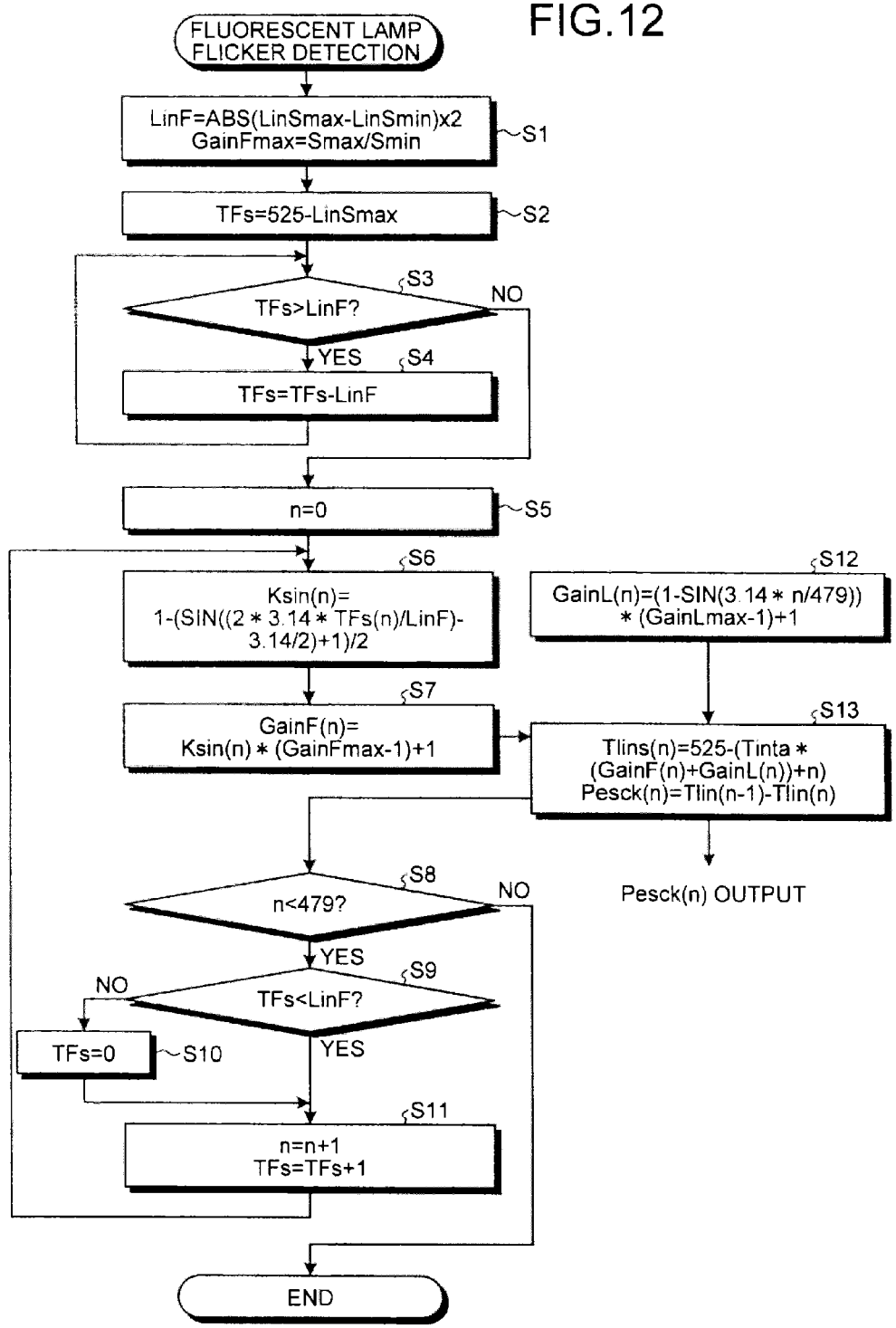

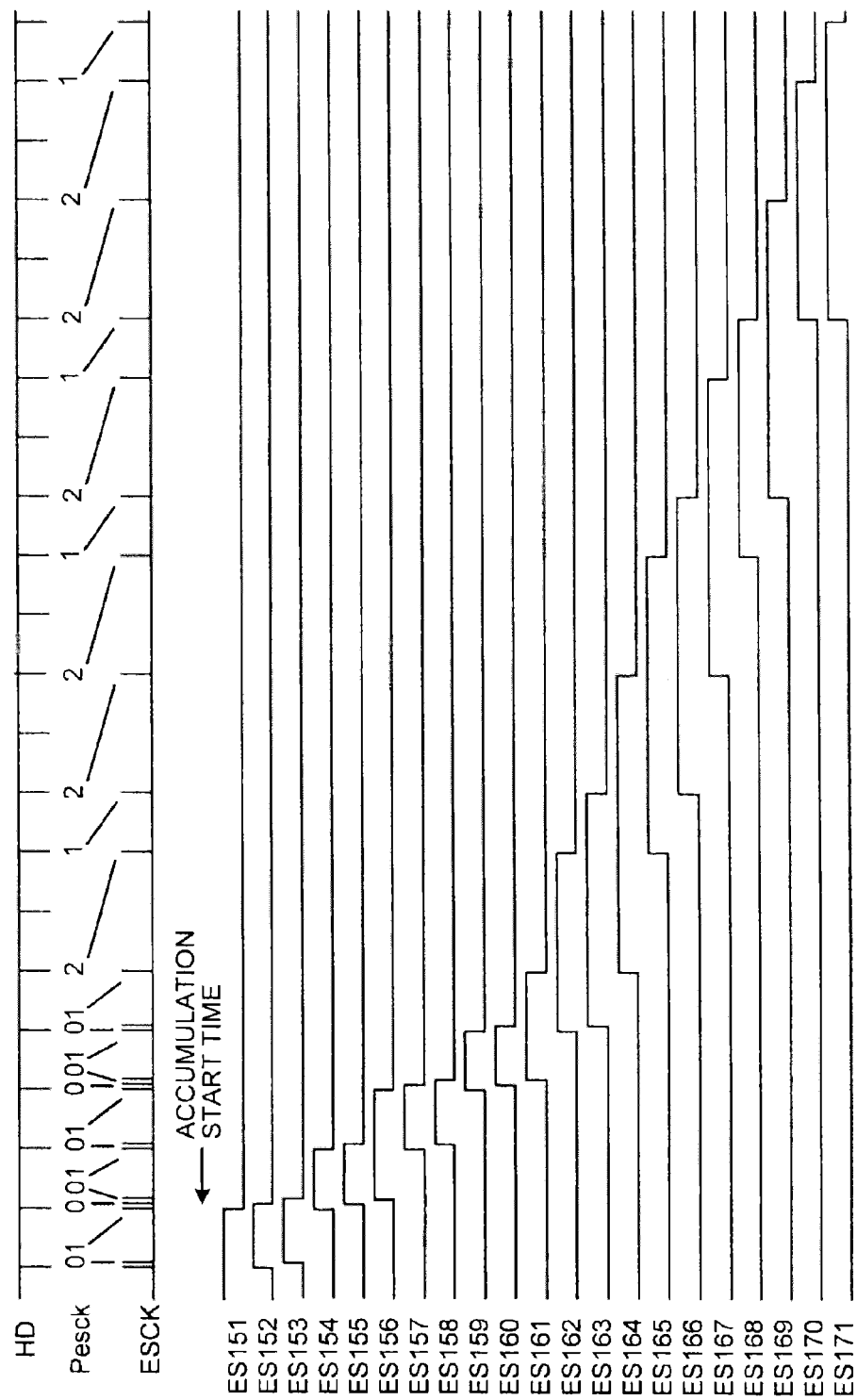

NO FLICKER

FLICKER OCCURS

US 8,570,395 B2

SOLID-STATE IMAGING DEVICE

CROSS-REFERENCE TO RELATED APPLICATIONS

This application is a division of U.S. application Ser. No. 12/849,345 filed Aug. 3, 2010, which is based upon and claims the benefit of priority from the prior Japanese Patent Application No. 2009-245847 filed Oct. 26, 2009; the entire contents of each of which are incorporated herein by reference.

FIELD

Embodiments described herein relate generally to a solid-state imaging device.

BACKGROUND

In a solid-state imaging device of a complementary metal oxide semiconductor (CMOS) type, a flicker like a lateral strip occurs under a fluorescent lamp. As a measure against the flicker, there is a method of adjusting a gain of a signal level of each of lines through signal processing (Japanese Patent Application Laid-Open No. 2003-319204 and Japanese Patent Application Laid-Open No. 2004-222228). As another measure against the flicker, there is a method of switching accumulation time in a unit of a half of a power supply frequency of the fluorescent lamp to prevent the occurrence of the flicker and, when a light amount is in the middle of a light amount of the fluorescent lamp, adjusting a digital gain to supplement a signal amount (Japanese Patent Application Laid-Open No 2003-18458). As a method of suppressing the flicker without reducing the signal amount, there is a method of controlling accumulation time in line units (Japanese Patent Application Laid-Open No. 2007-215062).

However, in the methods disclosed in Japanese Patent Application Laid-Open No. 2003-319204 and Japanese Patent Application Laid-Open No. 2004-222228, a frequency of the flicker cannot be detected, scanning time for a plurality of fields is required for detection of the flicker, and the flicker like the lateral stripe fixed at the time of 60 hertz cannot be suppressed. In the method disclosed in Japanese Patent Application Laid-Open No. 2003-18458, the signal amount is as small as a half at the minimum and a signal to noise ratio is deteriorated by about 3 decibels by shot noise. In the method disclosed in Japanese Patent Application Laid-Open No. 2007-215062, because the flicker is detected from a change in a light amount during imaging under the fluorescent lamp illumination, if a subject has light and shade, the flicker cannot be accurately detected.

BRIEF DESCRIPTION OF THE DRAWINGS

FIG. 12 is a flowchart for explaining the method of controlling the accumulation time for each of the lines of the solid-state imaging device shown in FIG. 1 to suppress a flicker;
FIG. 13 is a timing chart of operation waveforms of the electronic shutter scanning circuit 5 shown in FIG. 1 at the time when the accumulation time is controlled for each of the lines.

DETAILED DESCRIPTION

In general, according to one embodiment, a solid-state imaging device includes a pixel unit, a flicker detecting unit, a flicker-level estimating unit, and a flicker correcting unit. In the pixel unit, pixels are arranged in a matrix shape. The flicker detecting unit detects, based on a magnitude relation of a signal amount in each of lines formed in the pixel unit with respect to an image signal of one frame picked up by the pixel unit, presence or absence of a flicker. The flicker-level estimating unit estimates, based on the presence or absence of the flicker detected by the flicker detecting unit, a flicker level in each of the lines of the next frame. The flicker correcting unit corrects, based on the flicker level estimated by the flicker-level estimating unit, for each of the lines, a flicker that occurs in a signal of an image picked up by the pixel unit.

Exemplary embodiments of a solid-state imaging device will be explained below in detail with reference to the accompanying drawings. The present invention is not limited to the following embodiments.

Figure 1:
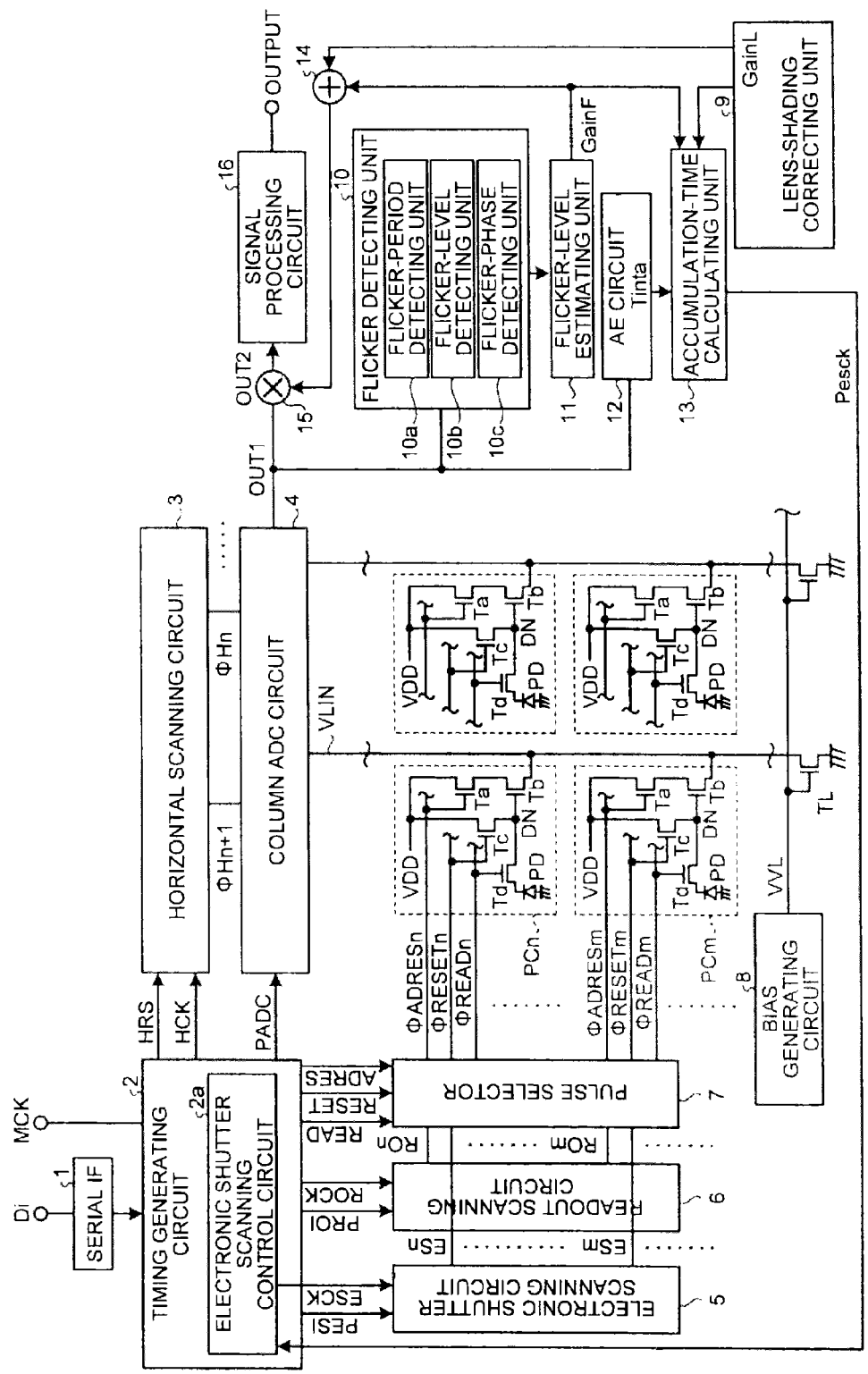
FIG. 1 is a block diagram of the schematic configuration of a solid-state imaging device according to a first embodiment.

FIG. 1 is a block diagram of the schematic configuration of a solid-state imaging device according to a first embodiment.

In FIG. 1, pixels for accumulating photoelectrically-converted charges are arranged in a matrix shape in an imaging unit of the solid-state imaging device. Cells PCn and PCm are provided in each of the pixels. In each of the cells PCn and PCm, a photodiode PD, a row selection transistor Ta, an amplification transistor Tb, a reset transistor Tc, and a readout transistor Td are provided.

In the cell PCn, a source of the readout transistor Td is connected to the photodiode PD. A readout signal ΦREADn is input to a gate of the readout transistor Td. A source of the reset transistor Tc is connected to a drain of the readout transistor Td. A reset signal ΦRESETn is input to a gate of the reset transistor Tc. A drain of the reset transistor Tc is connected to power supply potential VDD. A row selection signal ΦADRESn is input to a gate of the row selection transistor Ta. A drain of the row selection transistor Ta is connected to the power supply potential VDD. A source of the amplification transistor Tb is connected to a vertical signal line VLIN. A gate of the amplification transistor Tb is connected to the drain of the readout transistor Td. A drain of the amplification transistor Tb is connected to a source of the row selection transistor Ta.

A detection node DN is formed at a connection point of the gate of the amplification transistor Tb and the drain of the readout transistor Td. A drain of a load transistor TL is connected to the vertical signal line VLIN. A bias signal VVL is input to a gate of the load transistor TL. The load transistor TL configures a source follower. The load transistor TL can perform constant current operation.

In the cell PCm, a readout signal ΦREADm is input to the gate of the readout transistor Td. A reset signal ΦRESETm is input to the gate of the reset transistor Tc. A row selection signal ΦADRESm is input to the gate of the row selection transistor Ta.

The imaging unit of the solid-state imaging device includes a serial interface 1, a timing generating circuit 2, a horizontal scanning circuit 3, a column ADC circuit 4, an electronic shutter scanning circuit 5, a readout scanning circuit 6, a pulse selector 7, and a bias generating circuit 8. The serial interface 1 performs relay of input data. The timing generating circuit 2 controls timing for readout from and accumulation in the pixels. The horizontal scanning circuit 3 scans readout pixels in the horizontal direction. The column ADC circuit 4 performs correlated double sampling (CDS) processing and analog-to-digital (AD) conversion processing for a readout signal. The electronic shutter scanning circuit 5 performs electronic shutter scanning for each of lines. The readout scanning circuit 6 scans the readout pixels in the vertical direction. The pulse selector 7 generates the readout signal ΦREADn, the reset signal ΦRESETn, and the row selection signal ΦADRESn. The bias generating circuit 8 generates the bias signal VVL. The timing generating circuit 2 includes an electronic shutter scanning control circuit 2a that controls timing for electronic shutter scanning. The electronic shutter scanning circuit 5 and the readout scanning circuit 6 can include shift registers. The timing generating circuit 2 controls generation timing for accumulation start signals ESn and ESm and readout start signals Ron and Rom such that a predetermined line is selected.

The solid-state imaging device includes a lens-shading correcting unit 9, a flicker detecting unit 10, a flicker-level estimating unit 11, an output averaging circuit 12, an accumulation-time calculating unit 13, an adder 14, a multiplier 15, and a signal processing circuit 16. The lens-shading correcting unit 9 corrects lens shading. The clicker detecting unit 10 detects, based on a magnitude relation of a signal amount in each of the lines of the imaging unit, presence or absence of a flicker. The flicker-level estimating unit 11 estimates, based on the presence or absence of the flicker detected by the flicker detecting unit 10, a flicker level in each of the lines of the next frame. The output averaging circuit 12 averages outputs of the pixels to calculate a signal level of each of frames. The accumulation-time calculating unit 13 calculates, based on the flicker level estimated by the flicker-level estimating unit 11, for each of the lines, accumulation times for the pixels. The adder 14 adds up a flicker correction GainF calculated by the flicker-level estimating unit 11 and a shading correction coefficient GainL output from the lens-shading correcting unit 9. The multiplier 15 multiplies an output signal OUT1 output from the column ADC circuit 4 with an output of the adder 14. The signal processing circuit 16 performs digital signal processing for an output signal OUT output from the multiplier 15.

The flicker detecting unit 10 includes a flicker-period detecting unit 10a, a flicker-level detecting unit 10b, and a flicker-phase detecting unit 10c. The flicker-period detecting unit 10a detects, based on an interval between the lines in a position where a signal amount of each of the lines is minimum and a position where the signal amount is maximum, a flicker period. The flicker-level detecting unit 10b detects, based on a minimum and a maximum of the signal amount of each of the lines, a flicker level. The flicker-phase detecting unit 10c detects, based on a position of a line of the present frame where a signal amount is minimum or maximum and an interval to the next frame, a flicker phase.

The electronic-shutter scanning circuit 5 generates accumulation start signals ESn and ESm according to a timing control signal ESCK output from the electronic shutter scanning control circuit 2a and outputs the accumulation start signals ESn and ESm to the pulse selector 7. The readout scanning circuit 6 generates readout start signals ROn and ROm according to timing control signals PROI and ROCK output from the timing generating circuit 2 and outputs the readout start signals ROn and ROm to the pulse selector 7. The timing generating circuit 2 generates timing control signals READ, RESET, and ADRES for respectively controlling timings for readout, reset, and row selection and outputs the timing control signals READ, RESET, and ADRES to the pulse selector 7.

The pulse selector 7 generates, based on the timing control signals READ, RESET, and ADRES, the accumulation start signals ESn and ESm, and the readout start signals ROn and ROm, the read out signals ΦREADn and ΦREADm, the reset signals ΦRESETn and ΦRESETm, and the row selection signals ΦADRESn and ΦADRESm and sequentially outputs the read out signals ΦREADn and ΦREADm, the reset signals ΦRESETn and ΦRESETm, and the row selection signals ΦADRESn and ΦADRESm to the cells PCn and PCm.

When the row selection signal ΦADRESn is in an OFF state, the row selection transistor Ta is in an OFF state and does not perform source follower operation. Therefore, a signal is not output. At this point, when the readout signal ΦREADn is output to the cell PCn, the readout transistor Td of the cell PCn is turned on and signal charges accumulated in the photodiode PD are transferred to a detection node DN. Immediately after the transfer, the photodiode PD starts accumulation of valid signal charges (Tint). Thereafter, when the reset signal ΦRESETn is output to the cell PCn, the reset transistor Tc is turned on and the signal charges readout to the detection node DN are discharged.

When the turn-on of the row selection signal ΦADRESn is output to the cell PCn, the row selection transistor Ta of the cell PCn is turned on. Because the amplification transistor Tb and the load transistor TL of the cell PCn configure a source follower, a signal can be output. When the reset signal ΦRESETn is output to the cell PCn, the reset transistor Tc is turned on, and the charges accumulated in the detection node DN are reset. At this point, a source follower circuit outputs reset voltage of the detection node DN. The column ADC circuit 4 stores the reset voltage. When the turn-on of the readout signal ΦREADn is output to the cell PCn in the ON state of the row selection transistor Ta of the cell PCn, the readout transistor Td is turned on and a signal charge amount accumulated in the photodiode PD is read out to the detection node DN. Signal voltage (reset voltage+signal voltage) changed in the detection node DN is output to the column ADC circuit 4 through the source follower circuit. The column ADC circuit 4 removes the reset voltage.

The column ADC circuit 4 AD-converts the read-out signal voltage into one horizontal period and stores digital data in a line memory. Data for one line is sequentially read out from the line memory in the next one horizontal period.

When the readout signal ΦREADm is output to the PCm in the OFF state of the row selection transistor Ta, the readout transistor Td of the cell PCm is turned on and the charges accumulated in the photodiode PD are accumulated in the detection node DN. After the charges accumulated in the photodiode PD of the cell PCm are accumulated in the detection node DN, when the reset signal ΦRESETm is output to the cell PCn, the rest transistor Tc is turned on and the charges accumulated in the detection node DN are discharged.

When the row selection signal ΦADRESm is output to the cell PCm, the row selection transistor Ta of the cell PCm is turned on. When the readout signal ΦREADm is output to the PCm in the ON state of the row selection transistor Ta of the cell PCm, the readout transistor Td is turned on and voltage corresponding to a charge amount accumulated in the photodiode PD is applied to the gate of the amplification transistor Tb. Because the amplification transistor Tb of the cell PCm and the load transistor TL configure a source follower, the voltage of the vertical signal line VLIN follows the voltage applied to the gate of the amplification transistor Tb.

The column ADC circuit 4 simultaneously converts a voltage change in the vertical signal line VLIN into a digital signal and stores the digital signal in the line memory. In the next horizontal scanning period, data for one line is sequentially read out in the horizontal direction from the line memory. While a line as a readout target is incremented by one at a time, readout of data for one line is repeated, whereby data for one frame is read out.

When the column ADC circuit 4 detects the read-out data, the column ADC circuit 4 outputs an output signal OUT1 corresponding to a result of the detection to the flicker detecting unit 10, the output averaging circuit 12, and the multiplier 15.

When the output signal OUT1 is output to the flicker detecting unit 10, the flicker-period detecting unit 10a detects a flicker period LinF and the flicker-level detecting unit 10b detects a flicker level GainFmax. The flicker-phase detecting unit 10c detects time TFs from a line in which a signal amount is minimum or maximum to a readout line of the next frame and outputs the time TFs to the flicker-level estimating unit 11.

The clicker-level estimating unit 11 estimates, based on the flicker period LinF, the flicker level GainFmax, and the time TFs to the readout line of the next frame, flicker correction gains GainF of the lines of the next frame and outputs the flicker correction gains GainF to the accumulation-time calculating unit 13 and the adder 14.

The lens-shading correcting unit 9 outputs a shading correction coefficient GainL for correcting, for each of the line, shading in the vertical direction of a lens to the accumulation-time calculating unit 13 and the adder 14.

The adder 14 adds up the flicker correction gains GainF and the shading correction coefficient GainL and outputs an added-up value to the multiplier 15. The multiplier 15 multiplies the output signal OUT1 with the output from the adder 14, whereby a flicker component and a lens shading component included in the output signal OUT1 are corrected and output to the signal processing circuit 16. Consequently, a gain of a signal readout from the pixels is controlled for each of the lines, whereby the flicker component included in the output signal OUT1 is corrected.

On the other hand, accumulation times for the pixels are controlled for each of the lines, whereby the flicker component included in the output signal OUT1 can also be corrected. In this case, the output averaging circuit 12 averages outputs of the pixels of the output signal OUT1 to calculate average accumulation time Tinta in a pixel area and outputs the average accumulation time Tinta to the accumulation-time calculating unit 13.

The accumulation-time calculating unit 13 calculates, based on the flicker correction gain GainF, the shading correction coefficient GainL, and the accumulation time Tinta, for each of the lines, an accumulation time control signal Pesck for controlling accumulation times for the pixels and outputs the accumulation time control signal Pesck to the electronic shutter scanning control circuit 2a.

The electronic shutter scanning control circuit 2a controls, based on the accumulation time control signal Pesck, the timing control signal ESCK to control the accumulation start signals ESn and ESm and corrects the flicker component included in the output signal OUT1.

Figure 2:
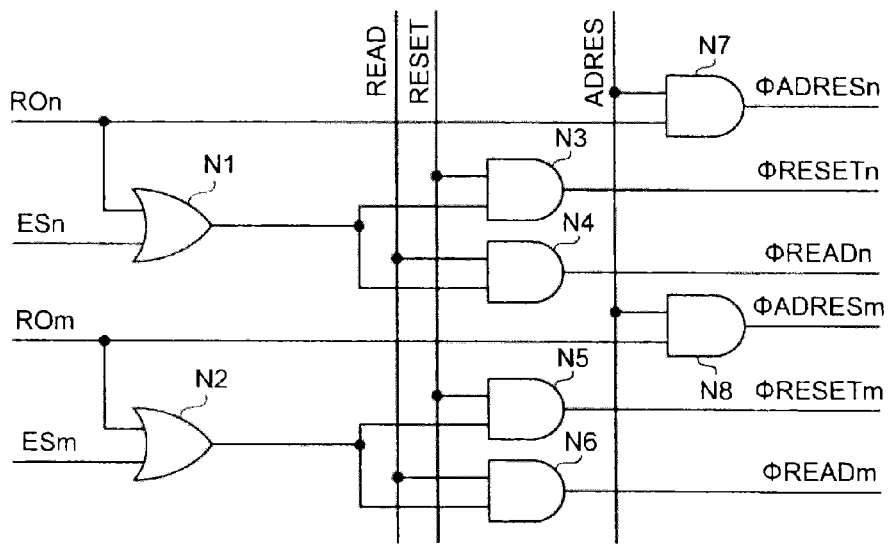
FIG. 2 is a circuit diagram of the schematic configuration of a pulse selector 7 shown in FIG. 1.

FIG. 2 is a circuit diagram of the schematic configuration of the pulse selector 7 shown in FIG. 1.

In FIG. 2, the pulse selector 7 includes OR circuits N1 and N2 and AND circuits N3 to N8. The readout start signal ROn is input to one input terminal of the OR circuit N1 and the accumulation start signal ESn is input to the other input terminal of the OR circuit N1. The readout start signal ROm is input to one input terminal of the OR circuit N2 and the accumulation start signal ESm is input to the other input terminal of the OR circuit N2.

A timing control signal RESET is input to one input terminal of the AND circuit N3 and an output of the OR circuit N1 is input to the other input terminal of the AND circuit N3. A timing control signal READ is input to one input terminal of the AND circuit N4 and an output of the OR circuit N1 is input to the other input terminal of the AND circuit N4. The timing control signal RESET is input to one input terminal of the AND circuit N5 and an output of the OR circuit N2 is input to the other input terminal of the AND circuit N5. The timing control signal READ is input to one input terminal of the AND circuit N6 and an output of the OR circuit N2 is input to the other input terminal of the AND circuit N6.

A timing control signal ADRES is input to one input terminal of the AND circuit N7 and the readout start signal ROn is input to the other input terminal of the AND circuit N7. The timing control signal ADRES is input to one input terminal of the AND circuit N8 and the readout start signal ROm is input to the other input terminal of the AND circuit N8.

The AND circuits N3 and N5 respectively output the reset signals ΦRESETn and ΦRESETm. The AND circuits N4 and N6 respectively output the readout signals ΦREADn and ΦREADm. The AND circuits N7 and N8 respectively output the row selection signals ΦADRESn and ΦADRESm.

Figure 3:
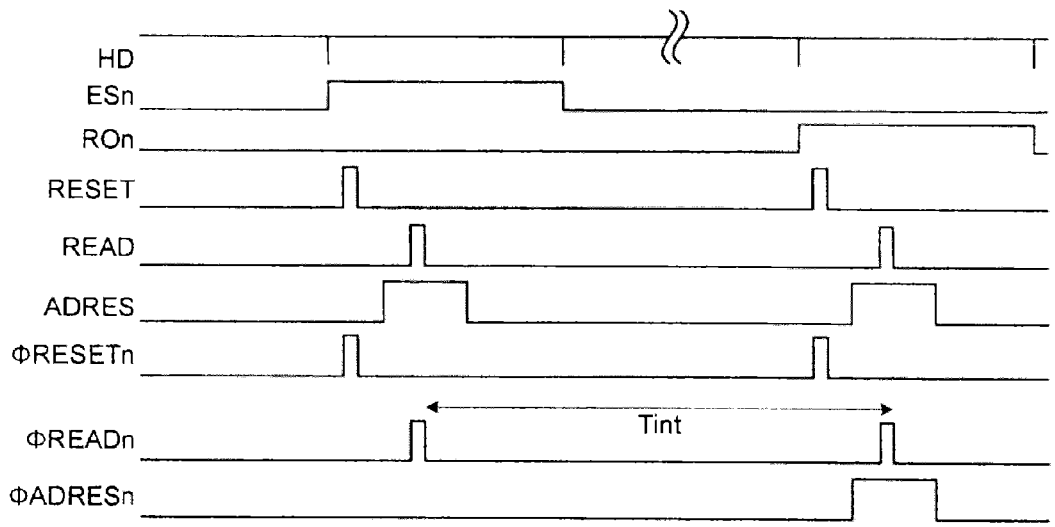
FIG. 3 is a timing chart of operation waveforms of the pulse selector 7 shown in FIG. 1.

FIG. 3 is a timing chart of operation waveforms of the pulse selector 7 shown in FIG. 1.

In FIG. 3, the accumulation start signal ESn and the readout start signal ROn are output in synchronization with a horizontal synchronization signal HD. When the timing control signal RESET changes to a high level when the accumulation start signal ESn is at the high level, the reset signal ΦRESETn is output. When the timing control signal READ changes to the high level when the accumulation start signal ESn is at the high level, the readout signal ΦREADn is output.

When the timing control signal RESET changes to the high level when the readout start signal ROn is at the high level, the reset signal ΦRESETn is output. When the timing control signal READ changes to the high level when the readout start signal ROn is at the high level, the readout signal ΦREADn is output. When the timing control signal ADRES changes to the high level when the readout start signal ROn is at the high level, the row selection signal ΦADRESn is output. Tint represents an accumulation period.

Figure 4:
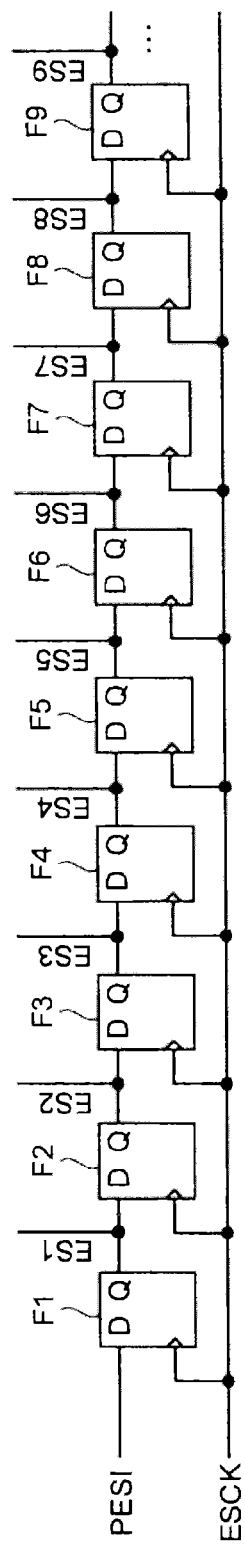
FIG. 4 is a circuit diagram of the schematic configuration of an electronic shutter scanning circuit 5 shown in FIG. 1.

FIG. 4 is a circuit diagram of the schematic configuration of the electronic shutter scanning circuit 5 shown in FIG. 1.

In FIG. 4, a plurality of flip-flops F1 to F9 are provided in the electronic shutter scanning circuit 5. The number of the flip-flops F1 to F9 can be set to correspond to the number of lines. The flip-flops F1 to F9 are sequentially connected in series. Accumulation start signals ES1 to ES9 are output from output terminals of the flip-flops F1 to F9. The timing control signal ESCK is input to clock terminals of the flip-flops F1 to F9. A timing control signal PESI is input to the flip flop F1.

Figure 5:
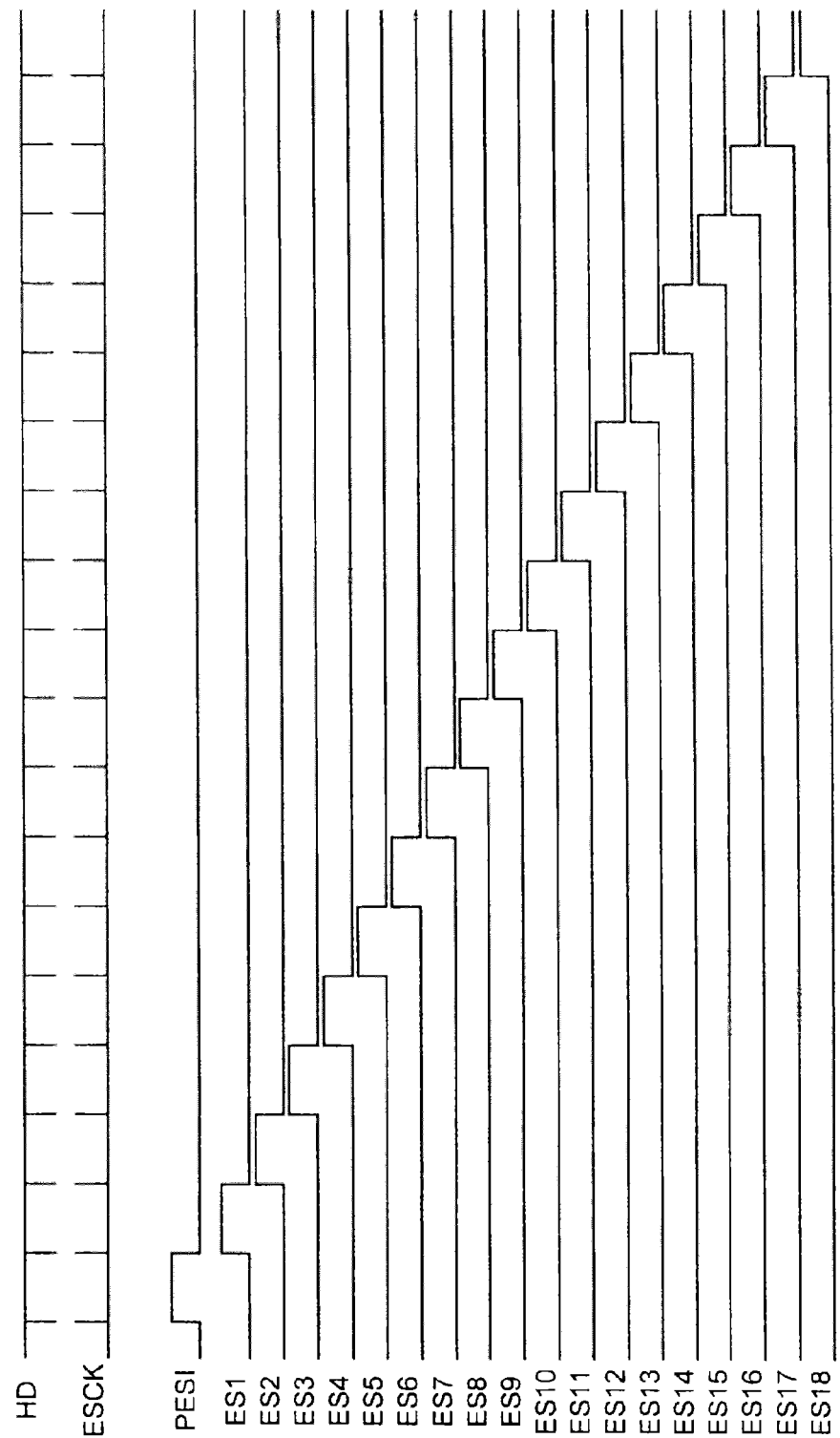
FIG. 5 is a timing chart of operation waveforms of the electronic shutter scanning circuit 5 shown in FIG. 1.

FIG. 5 is a timing chart of operation waveforms of the electronic shutter scanning circuit 5 shown in FIG. 1.

In FIG. 5, when the timing control signal ESCK is output every 1H (a horizontal period), the timing control signal PESI is shifted every 1H and the accumulation start signals ES1 to ES9 are sequentially output. Pulse width of the timing control signal PESI is not limited to 1H and can be arbitrarily set to 2H, 3H, or the like.

Figure 6:
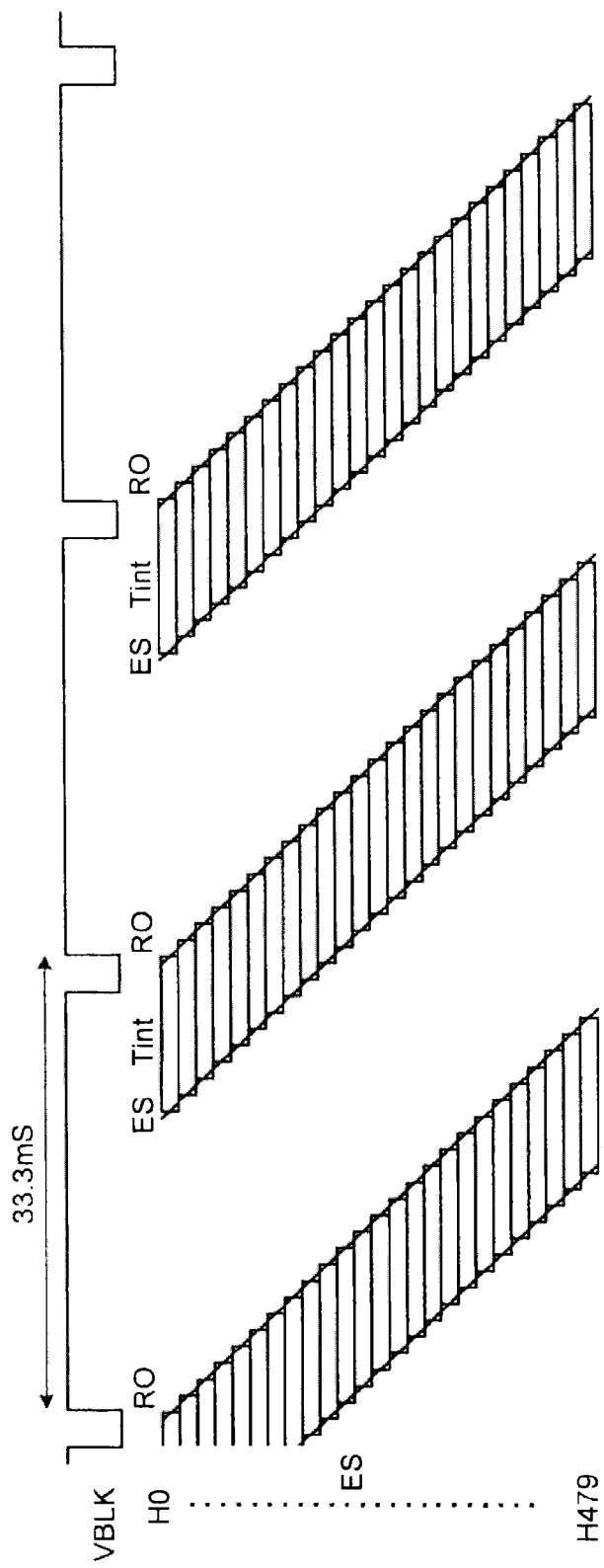
FIG. 6 is a diagram of accumulation time in each of lines at the time when no flicker occurs in the solid-state imaging device shown in FIG. 1.

FIG. 6 is a diagram of accumulation time for each of the lines at the time when no flicker occurs in the solid-state imaging device shown in FIG. 1.

In FIG. 6, for example, a vertical synchronization signal VBLK is output at an interval of 33.3 milliseconds and time for one frame is specified by the vertical synchronization pulse VBLK. A high level period of the vertical synchronization signal VBLK is a valid period and a low level period of the vertical synchronization signal VBLK is an invalid period. For example, in the case of VGA, 480H from H0 to H479 are valid.

Time from output timing of the accumulation start signal ES to output timing of the readout start signal RO is accumulation time Tint. The accumulation start signal ES and the readout start signal RO are caused to operate while being sequentially shifted 1H at a time. The accumulation time Tint (Tint=Tinta) can be averaged by the output averaging circuit 12 to be set long or short. The timing generating circuit 2 can control, based on the accumulation time Tint, generation timing for the timing control signal PESI.

Figure 7:
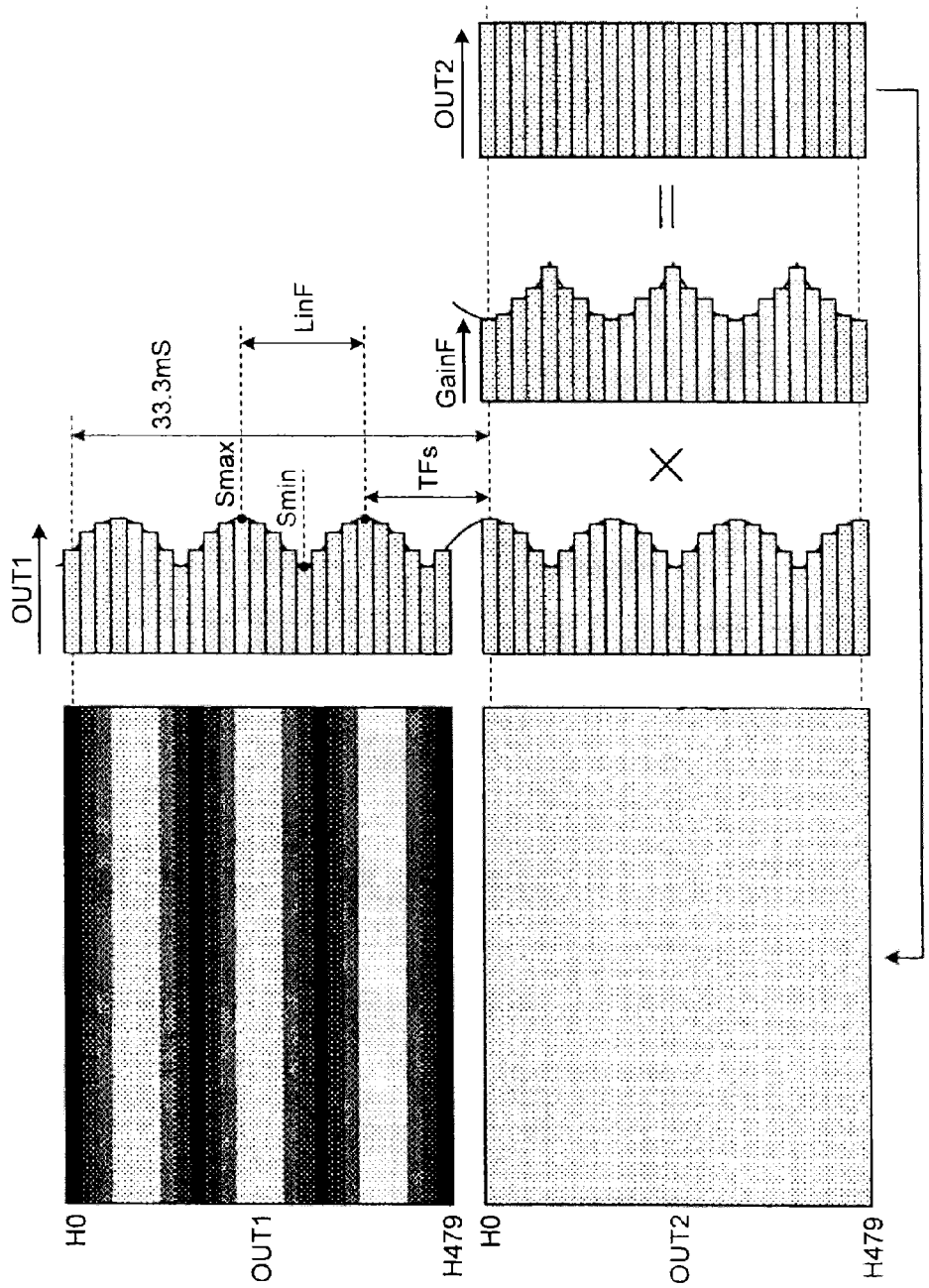
FIG. 7 is a diagram for explaining a method of controlling a gain for each of the lines of the solid-state imaging device shown in FIG. 1 to suppress a flicker.

FIG. 7 is a diagram for explaining a method of controlling a gain for each of the lines of the solid-state imaging device shown in FIG. 1 to suppress a flicker.

In FIG. 7, under a fluorescent lamp, when a commercial frequency is 50 hertz, no flicker occurs if the accumulation time Tint is set to an integer time as large as $1/(50*2)=10$ mS. Similarly, when the commercial frequency is 60 hertz, no flicker occurs if the accumulation time Tint is set to an integer time as large as $1/(60*2)=8.3$ mS. When the accumulation time Tint is other time, because a light emission amount of the fluorescent lamp changes, accumulation amounts of the lines are different and a flicker like a lateral stripe occurs in a reproduced image obtained from the output signal OUT1.

The flicker detecting unit 10 detects a flicker, estimates, based on the flicker period LinF, the flicker level GainFmax, and the time TFs to the readout line of the next frame, the flicker correction gains GainF of the lines of the next frame, and multiplies, for each of the lines, the output signal OUT1 with the flicker correction gain GainF. This makes it possible to correct a flicker component included in the output signal OUT1.

Figure 8:
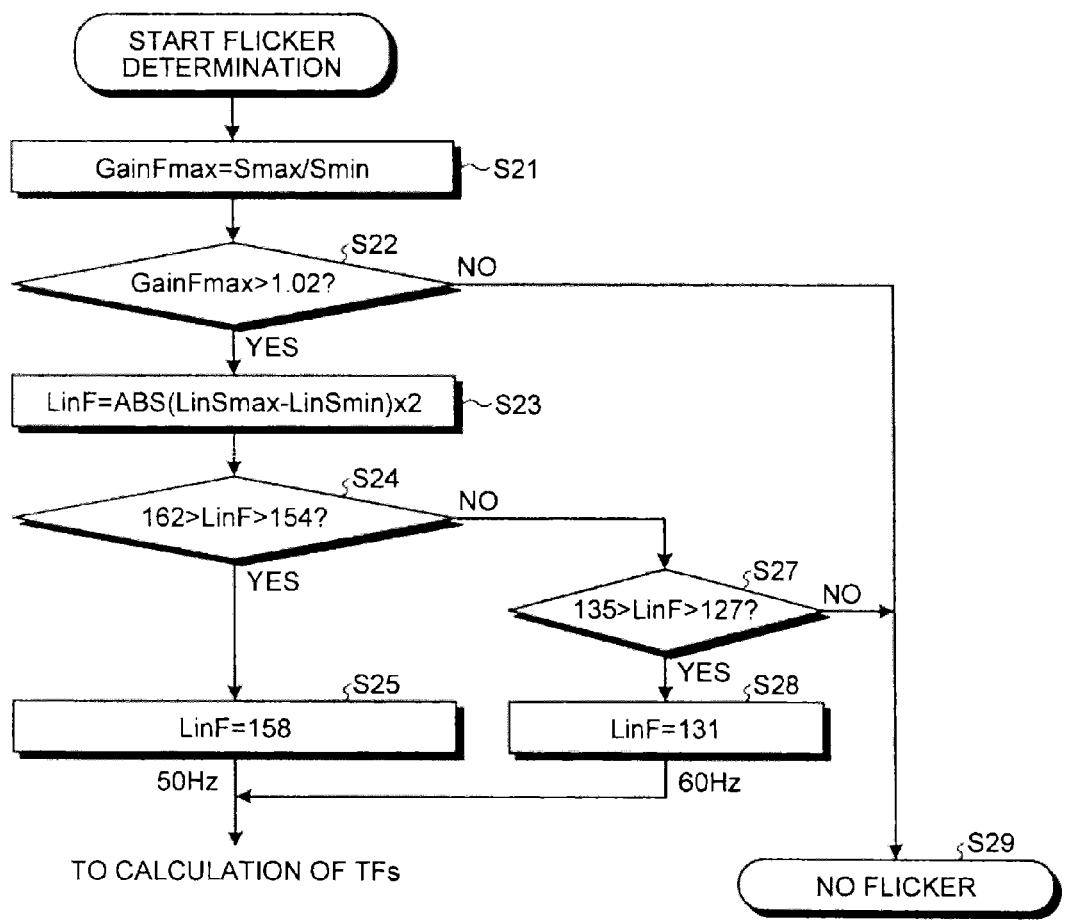
FIG. 8 is a flowchart for explaining a flicker detecting method for the solid-state imaging device shown in FIG. 1.

FIG. 8 is a flowchart for explaining a flicker detecting method for the solid-state imaging device shown in FIG. 1.

In FIG. 8, a flicker level GainFmax is calculated from a calculation GainFmax=Smax/Smin (step S21). When GainFmax>1.02, it is determined that a flicker occurs (step S22). A coefficient 1.02 can be set and changed as appropriate. The coefficient 1.02 can also be determined according to an amount of a difference Smax−Smin.

When it is determined that a flicker occurs, a calculation LinF=ABS(LinSmax−LinSmin)*2 is performed to calculate the number of lines of the flicker period LinF (step S23). At this point, for example, when the number of lines of the flicker period LinF is larger than 154 and smaller than 162 (step S24), it is determined that the flicker period LinF is 50 hertz and the flicker period LinF is set as LinF=158 (step S25).

On the other hand, when the number of lines of the flicker period LinF is larger than 127 and smaller than 135 (step S27), it is determined that the flicker period LinF is 60 hertz and the flicker period LinF is set as LinF=131 (step S28). When both the conditions at steps S24 and S27 are not satisfied, it is determined that no flicker occurs (step S29).

Figure 9:
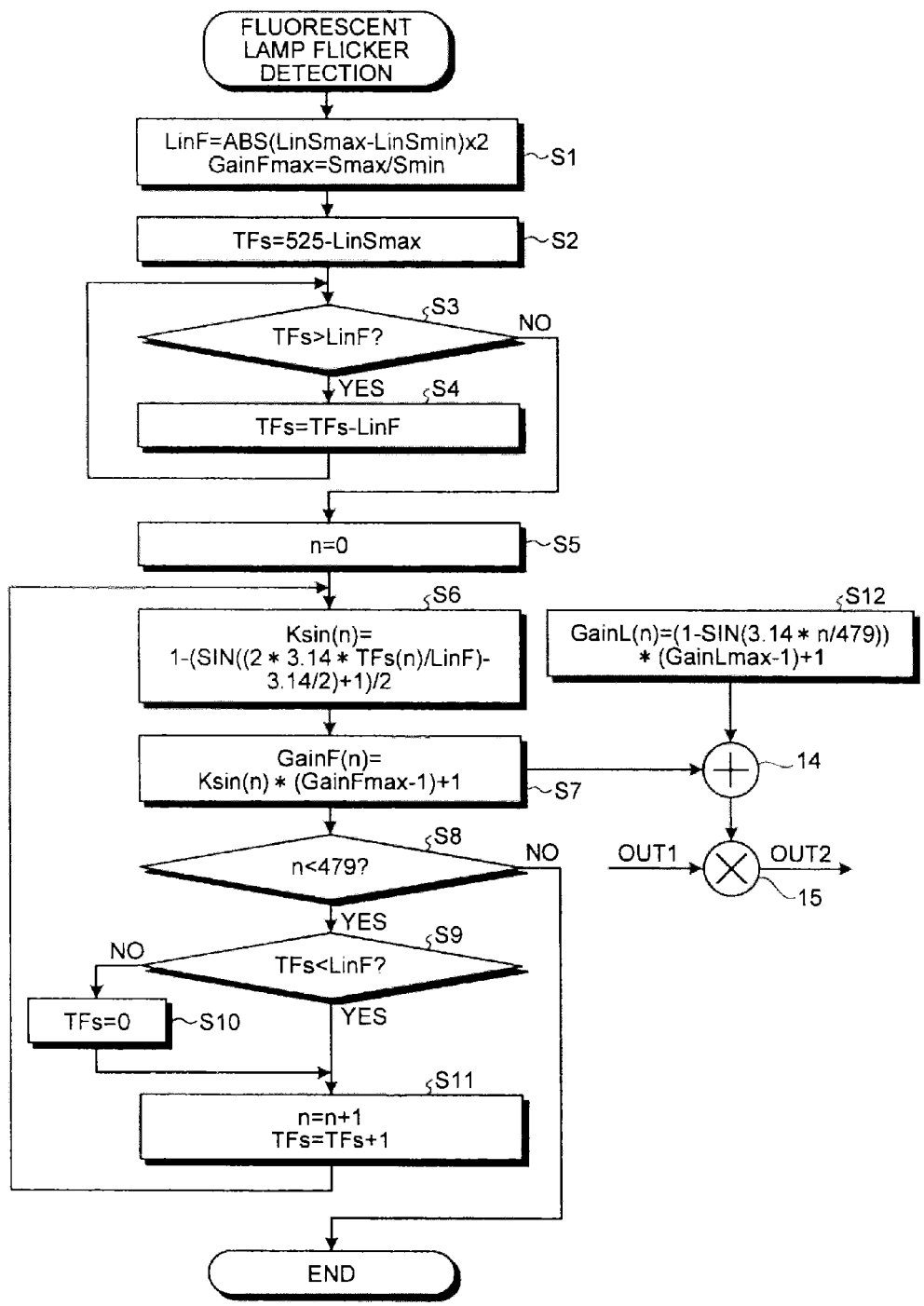
FIG. 9 is a flowchart for explaining the method of controlling a gain for each of the lines of the solid-state imaging device shown in FIG. 1 to suppress a flicker.

FIG. 9 is a flowchart for explaining a method of controlling a gain for each of the lines of the solid-state imaging device shown in FIG. 1 to suppress a flicker.

In FIG. 9, the clicker detecting unit 10 shown in FIG. 1 calculates the flicker period LinF, the flicker level GainFmax, and the time TFs to the signal line of the next frame as phase detection of a flicker.

To calculate these values, a maximum signal amount Smax and a minimum signal amount Smin and line numbers LINSmax and LINSmin of the maximum signal amount Smax and the minimum signal amount Smin are calculated from a signal amount added up and averaged in the horizontal direction. When the maximum signal amount Smax and the minimum signal amount Smin are calculated, because a signal level is high, attention can be paid to a predetermined center area of a screen having a satisfactory SNR. To improve calculation accuracy, an area of the screen can be divided to remove data generated by mistake.

The flicker period LinF can be calculated from a double of an absolute value of a difference between the line numbers LINSmax and LINSmin (step S1). Alternatively, the flicker period LinF can also be calculated from two places having different line numbers LINSmin. The flicker period LinF can also be calculated from an operating frequency. When the commercial frequency is 50 hertz, LinF=158H and, when the commercial frequency is 60 hertz, LinF=131H. When a calculation result of the flicker period LinF is substantially different from this value, it can be determined that no fluorescent lamp flicker occurs. Detection accuracy can be further improved by integrating calculation results for a plurality of frames instead of using a calculation result for one frame.

On the other hand, the flicker level GainFmax can be calculated form a calculation GainFmax=Smax/Smin (step S1).

The time TFs of the number of lines from a line in which a signal is maximum (or minimum) to a readout signal line of the next frame can be calculated by subtracting the line number LINSmax from the number of lines because one frame includes 255 H lines in VGA operation (step S2). When the time TFs is larger than the flicker period LinF, the number of lines for the flicker period LinF is subtracted from the number of lines to calculate the time TFs (steps S3 and S4). The time TFs can be calculated with the line number LINSmin set as a reference.

The flicker-level estimating unit 11 estimates, based on the flicker period LinF, the flicker level GainFmax, and the time TFs to the readout line of the next frame, the flicker correction gains GainF of the lines of the next frame.

For example, a fluorescent lamp flicker level can be processed as a change in a light amount obtained by subjecting a sine waveform of the commercial frequency to full-wave rectification. Specifically, for 480H from H0 to H479, a parameter Ksin(n) of a full-wave rectification waveform can be calculated to have a maximum of 1 and a minimum 0 while n is incremented by 1 at a time (steps S5 to S11). For example, when a signal of a flicker is assumed as a sine wave, the parameter Ksin(n) of the full-wave rectification waveform can be represented by the following formula:

$$K\sin(n)=1-(\text{SIN}((2*3.14*\text{TFs}(n)+n/\text{LinF})-3.14/2)+1)/2$$

For example, when TFs=0, Ksin(n)=0 and the flicker correction gain GainF is 1. When TFs=LinF/2, Ksin(n)=1 and the flicker correction gain GainF is GainFmax. A flicker can be suppressed by multiplying, for each of the lines n, the output signal OUT1 with the flicker correction gain GainF(n).

The shading correction coefficient GainL(n) is calculated (step S12) and the signal output OUT1 is multiplied with the shading correction coefficient GainL(n), whereby a fall in a signal amount due to shading of the lens in the vertical direction can be reduced.

The processing explained above is performed while the line number n is sequentially increased from 0 to 479, whereby a flicker for one frame is corrected (step S11). When the time TFs is equal to or larger than the flicker period LinF (step S9), the processing is repeated with the time TFs set a TFs=0 (step S10).

In this way, the flicker period LinF, the flicker level GainFmax=Smax/Smin, and the start time TFs of the next frame are calculated and the output signal OUT1 is amplified for each of the lines with the flicker correction gain GainF. This makes it possible to correct a fluorescent lamp flicker like a lateral stripe.

As the flicker period LinF, a fixed value such as 158H or 131H can be used according to a determination result. A flicker waveform is not limited to the sine waveform. Data tabled based on a measurement result can be used.

For example, in high-speed operation at 240 fps or the like, the maximum signal amount Smax and the minimum signal amount Smin cannot be obtained in one frame. This problem can be solved by measuring the maximum signal amount Smax and the minimum signal amount Smin from information concerning a plurality of frames. The flicker period LinF and the start time TFs can be calculated in the same manner.

Alternatively, data extracted at the time of 30 fps operation can be stored and reflected when the operation is shifted to 240 fps operation.

Accuracy of the maximum signal amount Smax and the minimum signal amount Smin can be further improved by setting the number of lines with a maximum flicker amount to 158H or 131H and setting a line with a maximum signal difference measured at this interval to the line numbers LINSmax and LINSmin.

A method of detecting, based on an output signal OUT1-0 of the preceding frame, a fluorescent lamp flicker and controlling accumulation times for the lines to suppress a flicker of an output signal OUT1-2 of the next frame is explained below.

Figure 10:
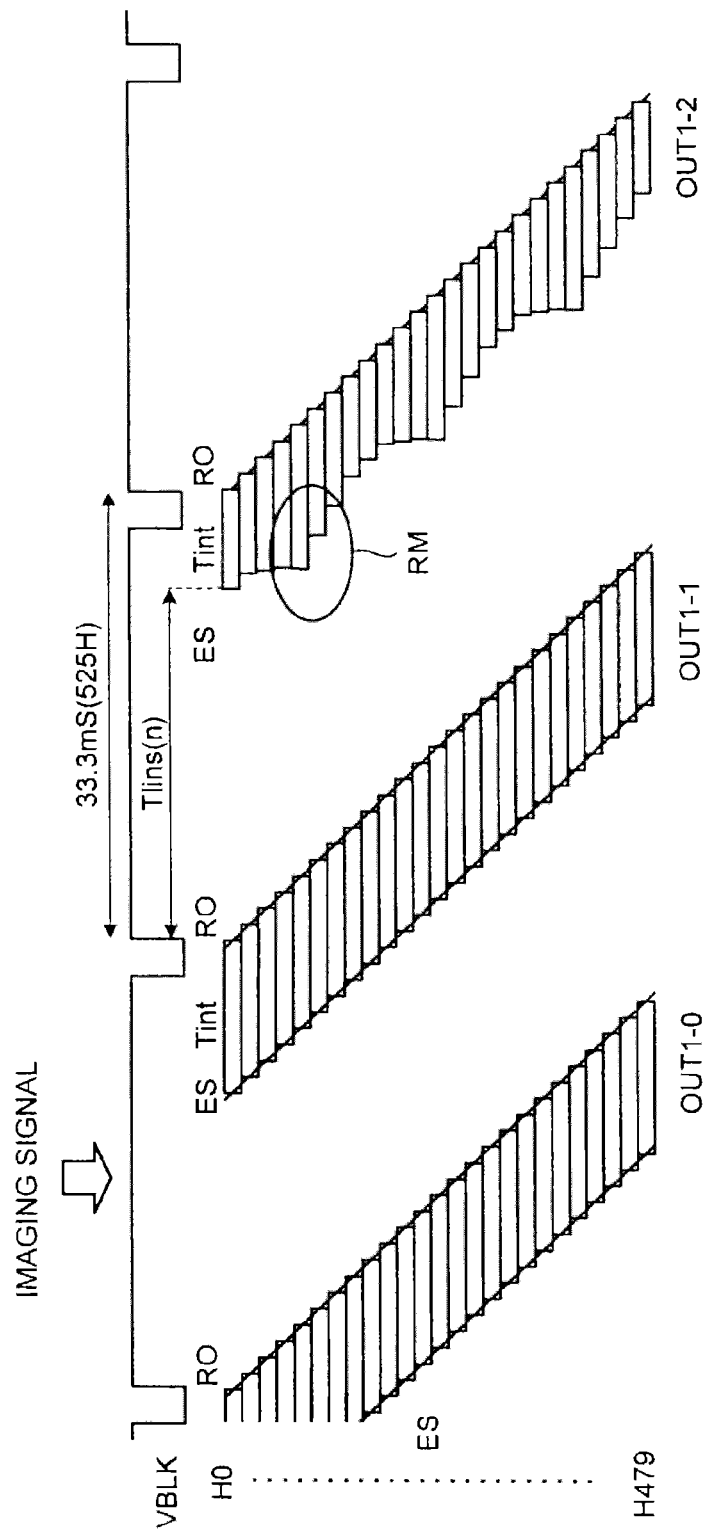
FIG. 10 is a diagram of accumulation time for each of the lines at the time when a flicker occurs in the solid-state imaging device shown in FIG. 1.

FIG. 10 is a diagram of accumulation time for each of the lines at the time when a flicker occurs in the solid-state imaging device shown in FIG. 1.

In FIG. 10, before the output signal OUT1-0 of the preceding frame, the output signal OUT1 is multiplied with the flicker correction gain GainF for each of the lines to correct the flicker component included in the output signal OUT1. The corrected signal is output as a monitor signal of a cellular phone. When an imaging signal is input to the imaging unit and a still image is picked up, accumulation times for the lines is controlled to suppress a flicker of the output signal OUT1-2 of the next frame. An SNR can be improved compared with the method of controlling gains of the lines by controlling accumulation times for the lines to suppress a flicker.

Figure 11:
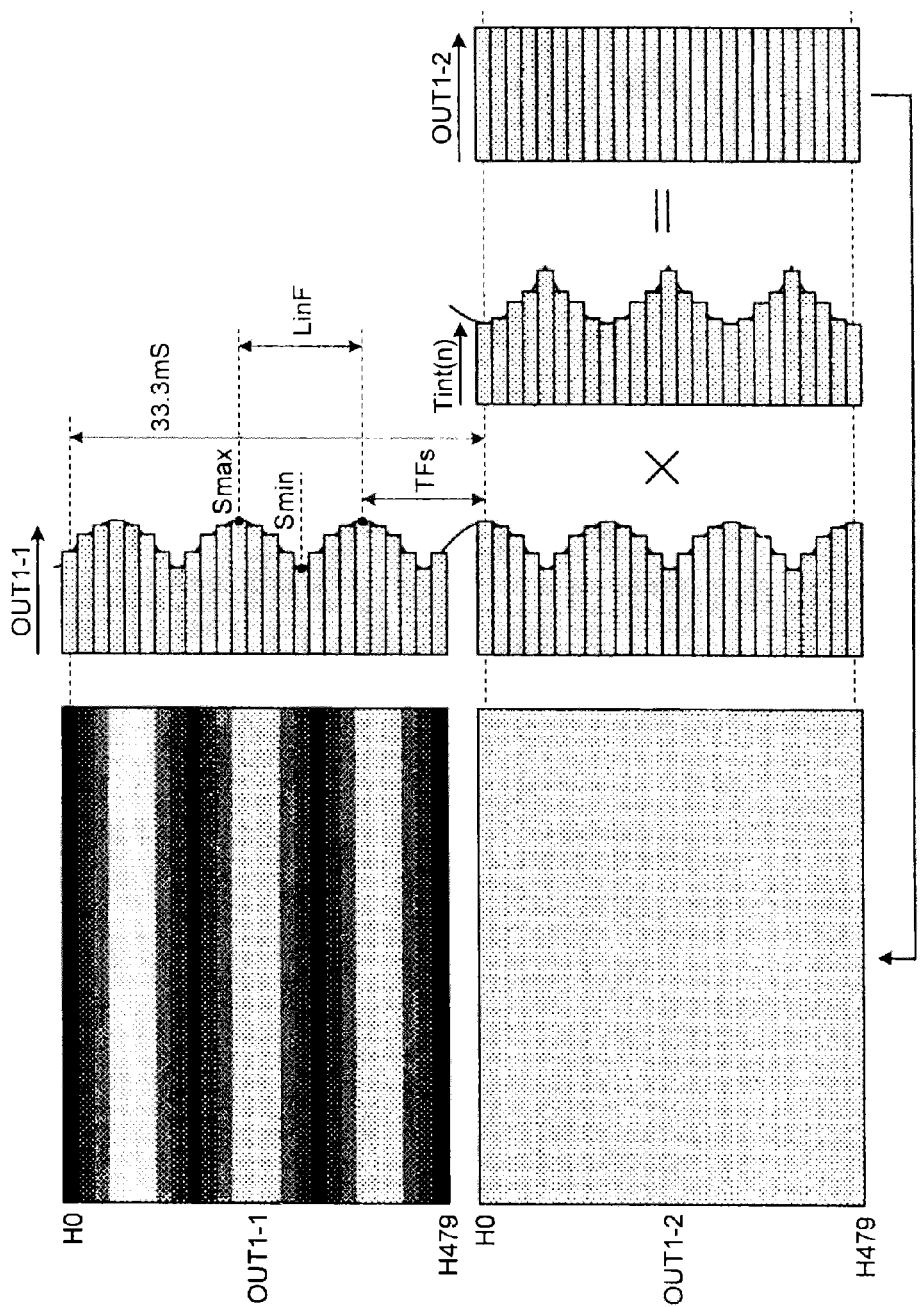
FIG. 11 is a diagram for explaining a method of controlling the accumulation time for each of the lines of the solid-state imaging device shown in FIG. 1 to suppress a flicker.

FIG. 11 is a diagram for explaining a method of controlling accumulation time for each of the lines of the solid-state imaging device shown in FIG. 1 to suppress a flicker.

In FIG. 11, when the accumulation time Tint is fixed, because a light emission amount of a fluorescent lamp changes, accumulation amounts of the lines are different. A flicker like a lateral stripe occurs on a reproduced screen obtained from an output signal OUT1-1 of the present frame.

The flicker detecting unit 10 detects a flicker, estimates, based on the flicker period LinF, the flicker level GainFmax, and the time TFs to the readout line of the next frame, accumulation times Tint(n) for the lines of the next frame, and controls the accumulation times Tint(n) for the lines. This makes it possible to correct a flicker component included in the output signal OUT1-1.

FIG. 12 is a flowchart for explaining the method of controlling the accumulation time for each of the lines of the solid-state imaging device shown in FIG. 1 to suppress a flicker.

In FIG. 12, when a monitor mode is switched to a still image photographing mode, the solid-state imaging device shifts to operation for controlling accumulation times for the lines.

To control the accumulation times Tint(n) for the lines, the accumulation-time calculating unit 13 sets, as start time Tlins(n) of the electronic shutter scanning circuit, a value obtained by multiplying together an addition result of the flicker correction gain GainF(n) and the shading correction coefficient GainL(n) and average accumulation time Tinta of the pixel area calculated by the output averaging circuit 12 (step S13). The accumulation time Tint(n) is a period until the next operation of the readout scanning circuit 6. The calculation of the start time Tlins(n) is repeated while n is sequentially increased from 0 to 479 by one at a time, whereby the accumulation time Tint(n) is controlled for each of the lines for all the frames.

To control the accumulation time Tint(n) for each of the lines, processing for controlling the timing control signal ESCK input to the electronic shutter scanning circuit 5 is carried out in the electronic shutter scanning control circuit 2a.

In this case, the accumulation-time calculating unit 13 calculates an accumulation time control signal Pesck(n) by applying a calculation Tlin(n−1)−Tlin(n) and inputs the accumulation time control signal Pesck(n) to the electronic shutter scanning control circuit 2a. The electronic shutter scanning control circuit 2a generates, based on the accumulation time control signal Pesck(n), the timing control signal ESCK.

FIG. 13 is a timing chart of operation waveforms of the electronic shutter scanning circuit 5 shown in FIG. 1 at the time when accumulation times is controlled for each of the lines. Accumulation start signals ES151 to ES171 are enlargement of a section of a circle RM shown in FIG. 10.

In FIG. 13, as the accumulation time control signal Pesck calculated by the accumulation time calculating unit 13, 0, 1, and 2 are obtained. When the accumulation time control signal Pesck is 0, the timing control signal ESCK is caused to additionally generate a pulse. The next n=n+1 is immediately carried out. When the next result is 0, the timing control signal ESCK is caused to generate a pulse again. The next n=n+1 is immediately carried out.

When the next result is 1, the timing control signal ESCK is not caused to generate a pulse and is caused to generate a pulse when the timing control signal ESCK shifts to the next horizontal scanning period HD. When the next result is 2, the timing control signal ESCK is not caused to generate a pulse even when the timing control signal ESCK shifts to the next horizontal scanning period HD. When the timing control signal ESCK shifts to the still next horizontal scanning period HD, the timing control signal ESCK is caused to generate a pulse. This processing is repeated to n=479.

The accumulation start signals ES151 to ES153 at this point can generate pulses in the same horizontal scanning period HD. The next accumulation start signals ES154 and ES155 can generate pulses in the same horizontal scanning period HD. The accumulation start signals ES161 and ES162 cause a shift of 2H in the horizontal scanning period HD. The timing control signal PESI at this point can input a pulse having width for 3H of the horizontal scanning period HD. When the accumulation time control signal Pesck is 3, the timing control signal ESCK can be caused to generate a pulse in synchronization with the horizontal scanning period HD after 3H. The timing control signal PESI at this point can input a pulse having width of 4H. Accumulation time for each of the lines can be variably controlled by reflecting a calculation result of the accumulation time control signal Pesck on the accumulation start signal ES in this way.

Figure 14A:
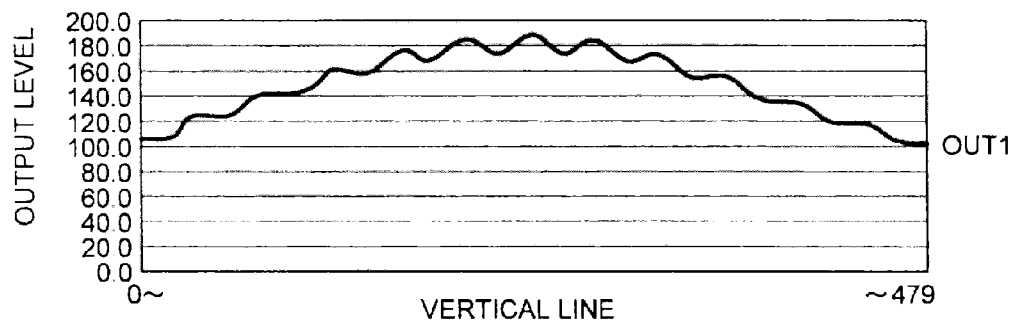
FIGS. 14A to 14C are graphs of output levels of vertical lines before and after correction of a flicker in the solid-state imaging device shown in FIG. 1.
Figure 14B:
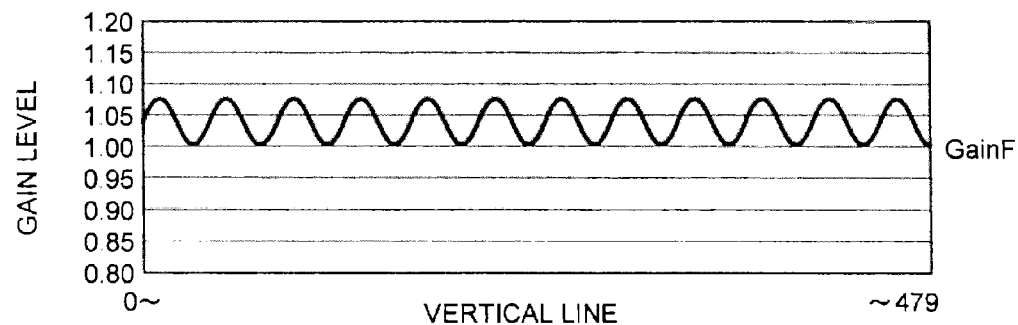
Figure 14C:
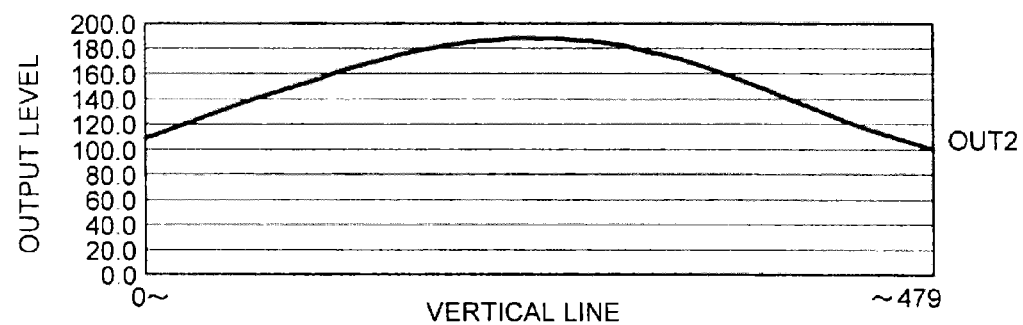

FIGS. 14A to 14C are graphs of output levels of vertical lines before and after correction of a flicker in the solid-state imaging device shown in FIG. 1. In an example shown in FIGS. 14A to 14C, a signal waveform in the vertical direction averaged in the horizontal direction when a subject having uniform density is actually photographed is shown.

In FIG. 14A, when the solid-state imaging device is caused to operate at 7.5 hertz, a fluorescent lamp flicker at 50 hertz occurs in the output signal OUT1. Lens shading also occurs in the output signal OUT1. As shown in FIG. 14B, the flicker-level estimating unit 11 obtains a signal waveform of the flicker correction gain GainF. The flicker correction gain GainF is generated on the assumption that a flicker waveform is a sine wave. As shown in FIG. 14C, the output signal OUT1 is multiplied with the flicker correction gain GainF, whereby an output signal OUT2 with a suppressed fluorescent lamp flicker is obtained.

Figure 15A:
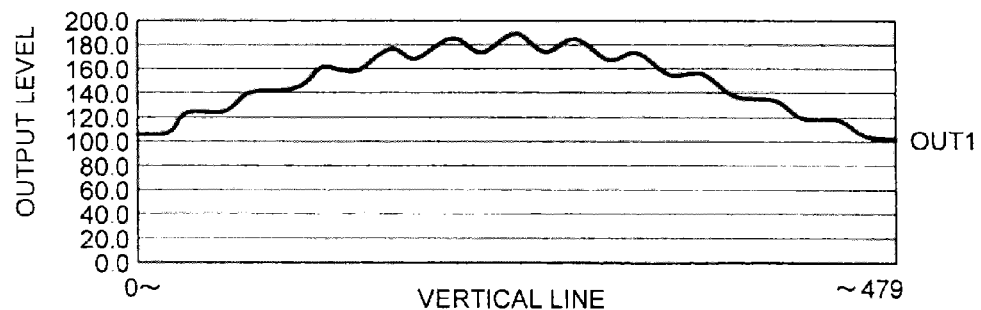
FIGS. 15A to 15C are graphs of output levels of vertical lines before and after correction of a flicker and shading in the solid-state imaging device shown in FIG. 1.
Figure 15B:
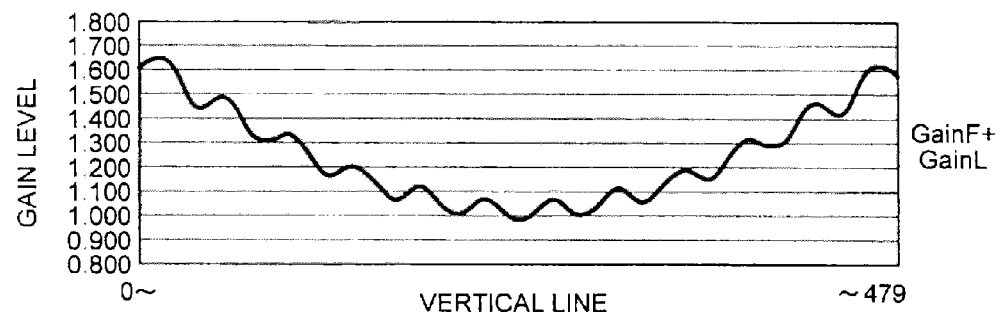
Figure 15C:
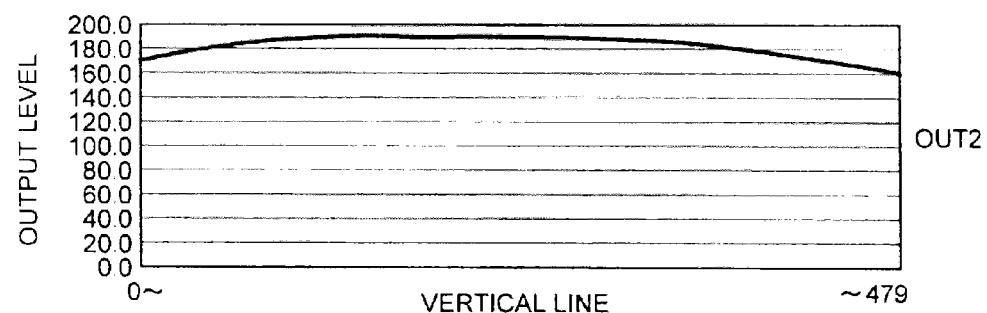

FIGS. 15A to 15C are graphs of output levels of the vertical lines before and after correction of a flicker and shading in the solid-state imaging device shown in FIG. 1.

In FIG. 15A, when the solid-state imaging device is caused to operate at 7.5 hertz, a fluorescent lamp flicker at 50 hertz occurs in the output signal OUT1. Lens shading also occurs in the output signal OUT1. As shown in FIG. 15B, the adder 14 obtains a signal waveform formed by adding up the flicker correction gain GainF and the shading correction coefficient GainL. As shown in FIG. 15C, the output signal OUT1 is multiplied with an addition result of the flicker correction gain GainF and the shading correction coefficient GainL, whereby the output signal OUTw with a suppressed fluorescent lamp flicker and suppressed lens shading is obtained.

When accumulation time is controlled instead of the flicker correction gain Gain being controlled, a signal waveform similar to the output signal OUT2 shown in FIGS. 14A to 14C and FIGS. 15A to 15C can be obtained.

Figure 16:
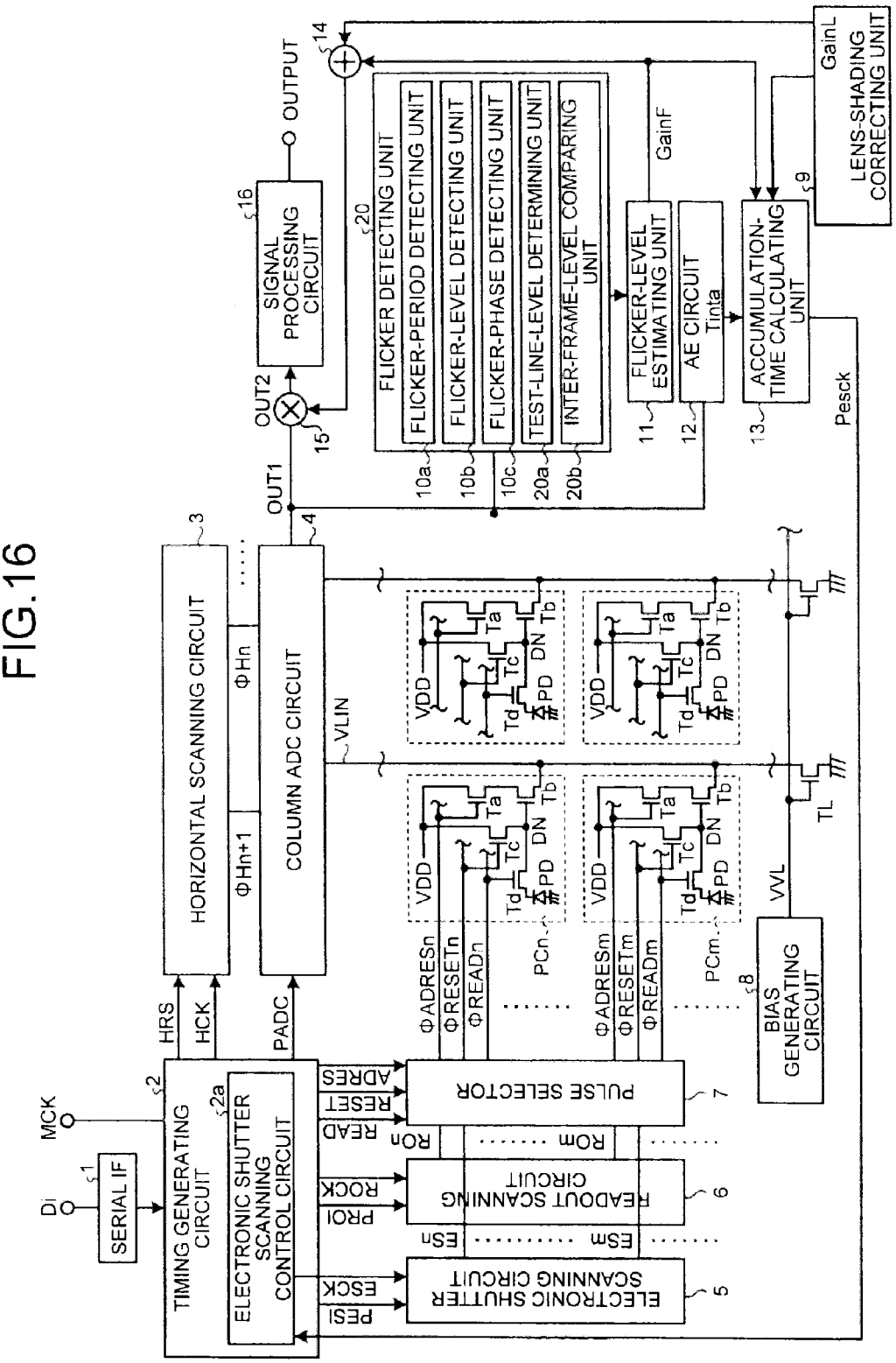
FIG. 16 is a block diagram of the schematic configuration of a solid-state imaging device according to a second embodiment.
Figure 17:
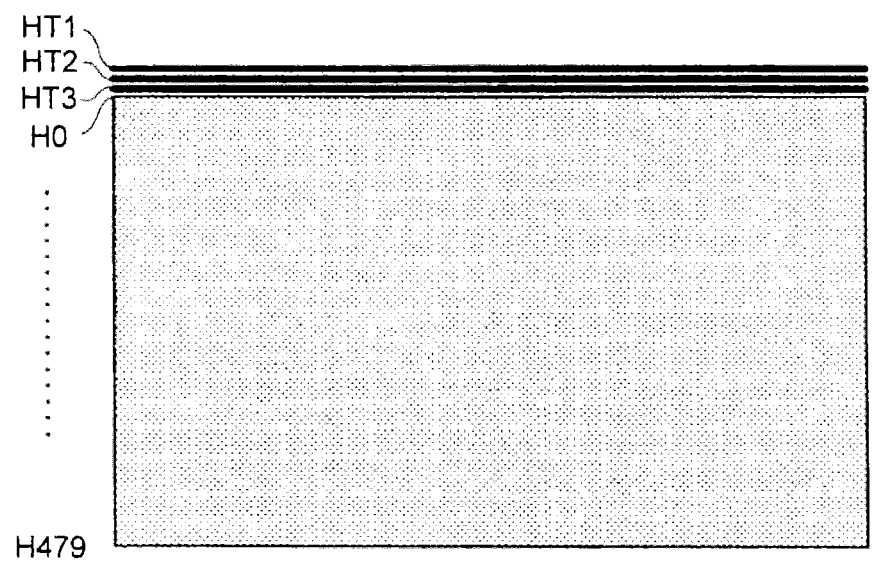
FIG. 17 is a plan view of the schematic configuration of an imaging plane applied to the solid-state imaging device shown in FIG. 16.

FIG. 16 is a block diagram the schematic configuration of a solid-state imaging device according to a second embodiment. FIG. 17 is a plan view of the schematic configuration of an imaging plane applied to the solid-state imaging device shown in FIG. 16.

In FIG. 16, the solid-state imaging device includes a flicker detecting unit 20 instead of the flicker detecting unit 10 shown in FIG. 1. The flicker detecting unit 20 includes a test-line-level determining unit 20a and an inter-frame-level comparing unit 20b in addition to the components of the flicker detecting unit 10. As shown in FIG. 17, the solid-state imaging device includes test lines HT1 to HT3 for minimum three lines on the outside of a valid area. The test lines HT1 to HT3 are desirably arranged above or below the valid area to be adjacent to one another.

The test-line-level determining unit 20a can detect, based on a magnitude relation of a signal amount in each of the test lines HT1 to HT3, presence or absence of a flicker. The inter-frame-level comparing unit 20b can determine a flicker period by comparing the signal amount in each of the test lines HT1 to HT3 among frames.

When the output signal OUT1 is output to the flicker detecting unit 20, the test-line-level determining unit 20a compares averages of signals in the lines of the test lines HT1 to HT3. When the averages are substantially the same values, it is determined that no flicker occurs. On the other hand, when a difference equal to or larger than a predetermined value occurs in the averages, it is determined that a flicker occurs. The inter-frame-level comparing unit 20b compares the averages of the signals of the test lines HT1 to HT3 among the frames. When the averages fluctuate among the frames, it is determined that a flicker frequency is 50 hertz. When the averages do not fluctuate among the frames, it is determined that the flicker frequency is 60 hertz.

Figure 18:
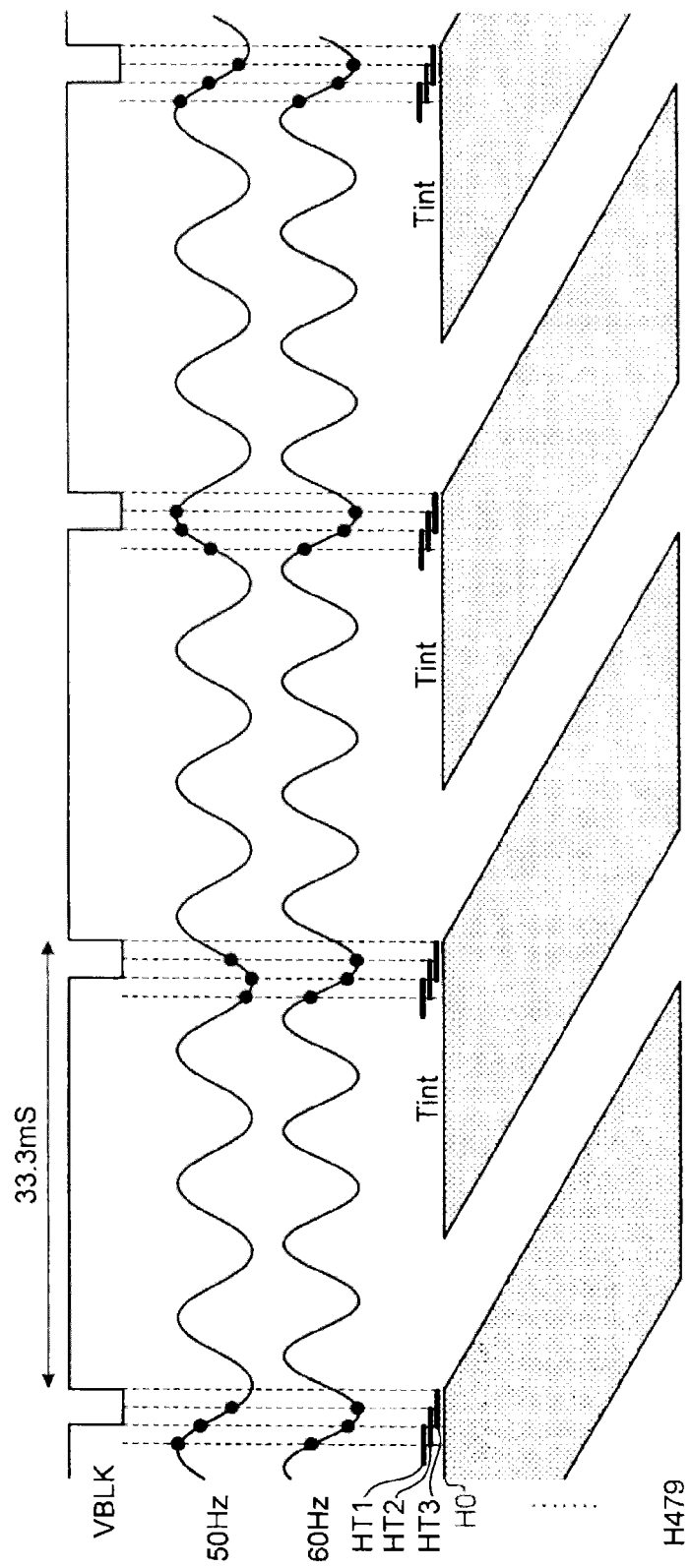
FIG. 18 is a diagram for explaining a flicker detecting method for the solid-state imaging device shown in FIG. 16.

FIG. 18 is a diagram of a clicker detecting method for the solid-state imaging device shown in FIG. 16.

In FIG. 18, readout from the test lines HT1 to HT3 is performed at timing shifted by time equal to or longer than 0.5 millisecond. Accumulation times are independently controlled for the test lines TH1 to HT3. The accumulation times are set to have an accumulation time difference equal to or shorter than 2.8 milliseconds such that signals from the test lines HT1 to HT3 can be read out in a vertical blanking period VBLK.

Presence or absence of a fluorescent lamp flicker and a frequency of 50 hertz or 60 hertz can be detected by comparing the averages of the signals of the test lines HT1 to HT3. Consequently, detection accuracy for a flicker can be improved. When the test lines HT1 to HT3 are arranged to be adjacent to one another, when no flicker occurs, substantially the same signal levels are obtained. When accumulation times for the test lines HT1 to HT3 are set short, flicker levels detected in the test lines HT1 to HT3 can be increased and detection accuracy can be improved.

Figure 19:
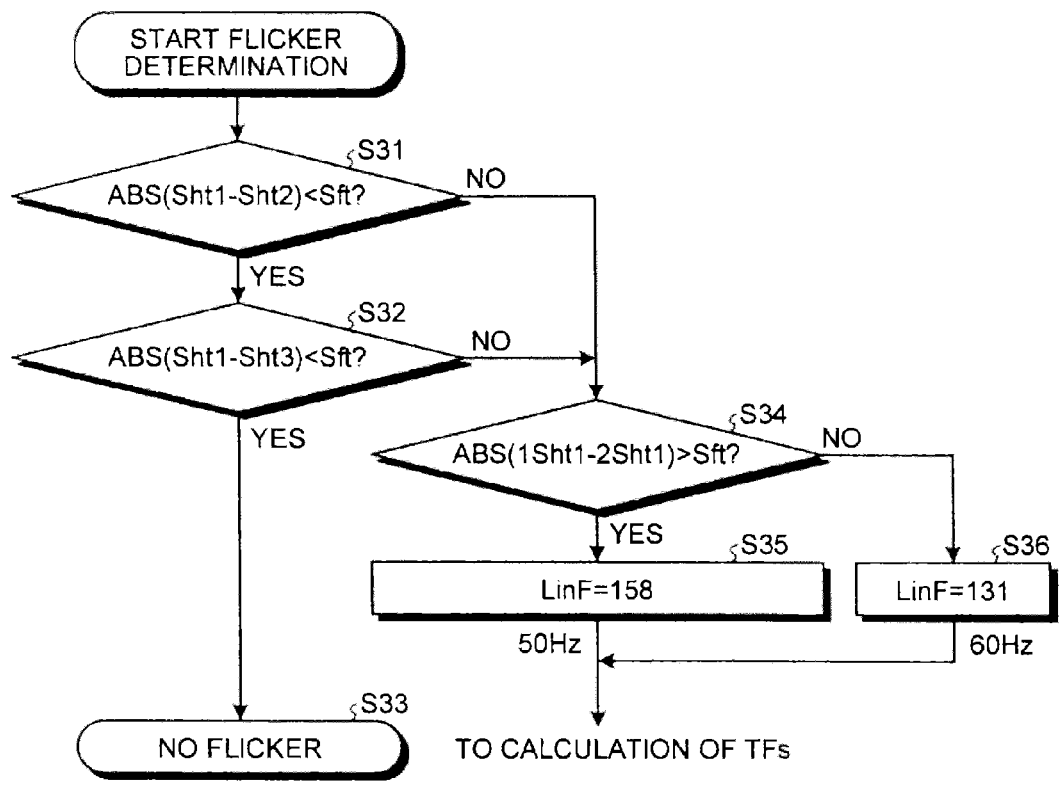
FIG. 19 is a flowchart for explaining the flicker detecting method for the solid-state imaging device shown in FIG. 16.

FIG. 19 is a flowchart for explaining a flicker detecting method for the solid-state imaging device shown in FIG. 16.

In FIG. 19, the averages of the signals of the test lines TH1 to HT3 shown in FIG. 17 are represented as Sht1, Sht2, and Sht3. When an absolute value of Sht1-Sht2 is equal to or larger than a flicker assumed level Sft, it is determined that a flicker occurs (step S31). On the other hand, when the absolute value of Sht1 to Sht2 is smaller than the flicker assumed level Sft, it is determined whether an absolute value of Sht1-Sht3 is equal to or larger than the flicker assumed level Sft (step S32). When the absolute value of Sht1-Sht3 is equal to or larger than the flicker assumed level Sft, it is determined that a flicker occurs. On the other hand, when the absolute value of Sht1 to Sht3 is smaller than the flicker assumed level Sft, it is determined that no flicker occurs (step S33).

When it is determined that a flicker occurs, a signal difference between two frames is calculated concerning the average of the signals of the test lines HT1 to HT3. For example, a signal in the first frame is represented as 1Sht1 and a signal of the second frame is represented as 2Sht1. When an absolute value of 1Sht1 to 2Sht1 is larger than the flicker assumed level Sft (step S34), it is determined that a flicker frequency is 50 hertz and the flicker period LinF is set to LinF=158 (step S35). On the other hand, when the absolute value of 1Sht1-2Sht1 is equal to or smaller than the flicker assumed level Sft, it is determined that the flicker frequency is 60 hertz and the flicker period LinF is set to LinF=131 (step S36).

Consequently, even if the flicker period LinF fluctuates more or less, the frequency 50 hertz or 60 hertz can be determined and the flicker period LinF can be accurately set. Even when an operating frequency of the solid-state imaging device is other than 30 hertz, the flicker period LinF can be accurately set by carrying out the same calculation.

Figure 20:
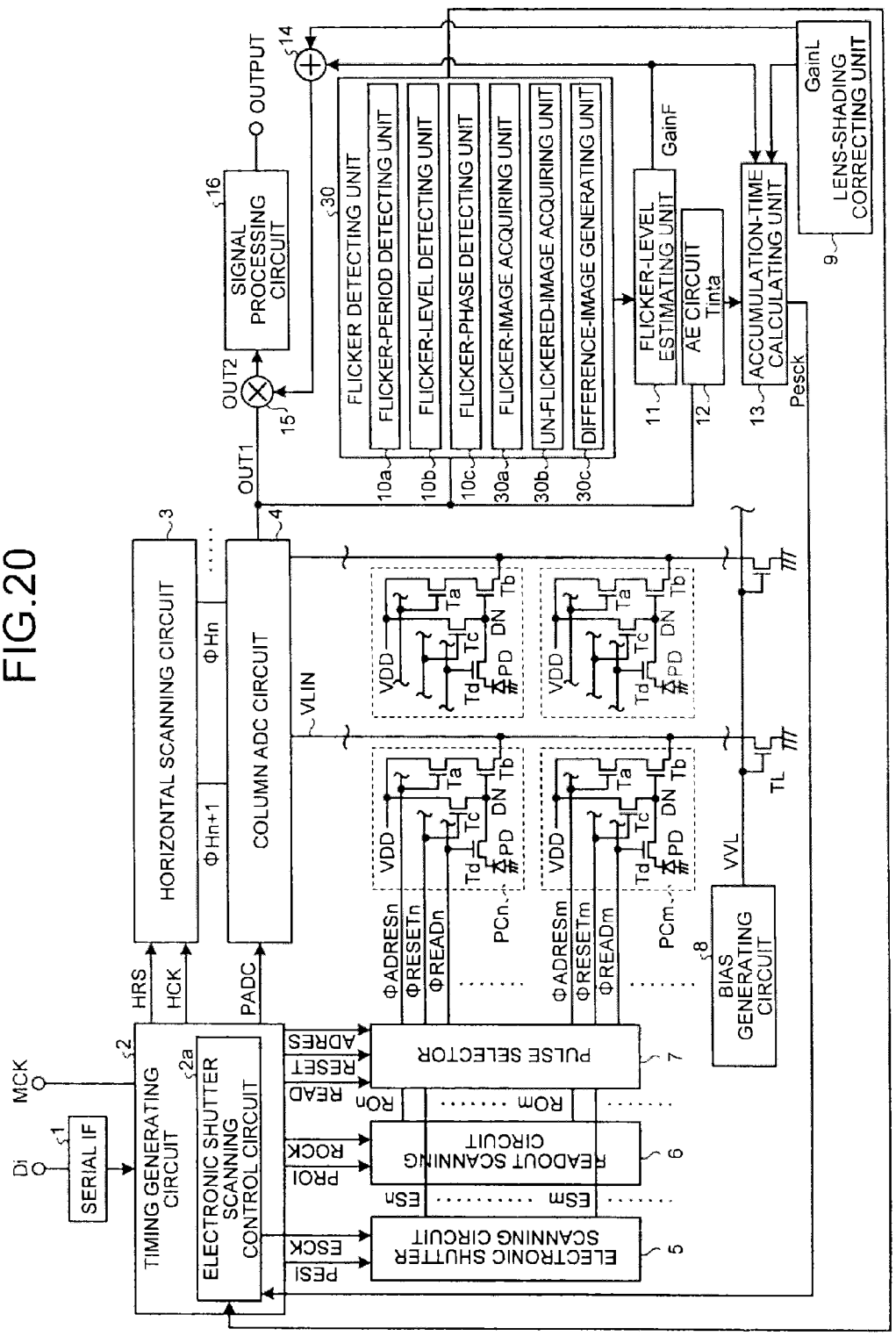
FIG. 20 is a block diagram of the schematic configuration of a solid-state imaging device according to a third embodiment.

FIG. 20 is a block diagram of the schematic configuration of a solid-state imaging device according to a third embodiment.

In FIG. 20, the solid-state imaging device includes a flicker detecting unit 30 instead of the flicker detecting unit 10 shown in FIG. 1. The flicker detecting unit 30 includes a flicker-image acquiring unit 30a, an un-flickered-image acquiring unit 30b, and a difference calculating unit 30c. In the solid-state imaging device, as shown in FIG. 17, the test lines HT1 to HT3 for minimum three lines are provided on the outside of the valid area.

The flicker-image acquiring unit 30a can acquire a flicker image signal in one frame set in accumulation time in which a flicker occurs. The un-flickered-image acquiring unit 30b can acquire an un-flickered image signal in one frame set in accumulation time in which no flicker occurs. The difference-image generating unit 30c can generate a difference image between the flicker image signal and the un-flickered image signal after correcting a level difference due to a difference between the accumulation times.

When a flicker is detected, accumulation time Tint1 of the first frame is set such that a flicker can be detected by the flicker-image acquiring unit 30a. The output signal OUT1 is acquired. Subsequently, accumulation time Tint2 of the second frame is set such that a flicker is cancelled by the un-flickered-image acquiring unit 30b. The output signal OUT1 is acquired. The difference-image generating unit 30c generates a difference image between the flicker image signal and the un-flickered image signal after correcting a level difference due to a difference between the accumulation times Tint1 and Tint2. This difference signal generation can be performed by using data of an average in the horizontal direction of the lines of the images.

The flicker-period detecting unit 10a detects the flicker period LinF referring to the difference image generated by the difference-image generating unit 30c. The flicker-level detecting unit 10b detects the flicker level GainFmax. The flicker-phase detecting unit 10c detects the time TFs from a line in which signal amount is minimum or maximum to a readout line of the next frame and outputs the time TFs to the flicker-level estimating unit 11.

The flicker-level estimating unit 11 estimates, based on the flicker period LinF, the flicker level GainFmax, and the time TFs to the readout line of the next frame, the flicker correction gain GainF of the lines of the next frame.

This flicker detection can be automatically performed during the start of imaging, can be periodically performed during operation of the solid-state imaging device, or can be forcibly performed according to an instruction from the outside.

Figure 21:
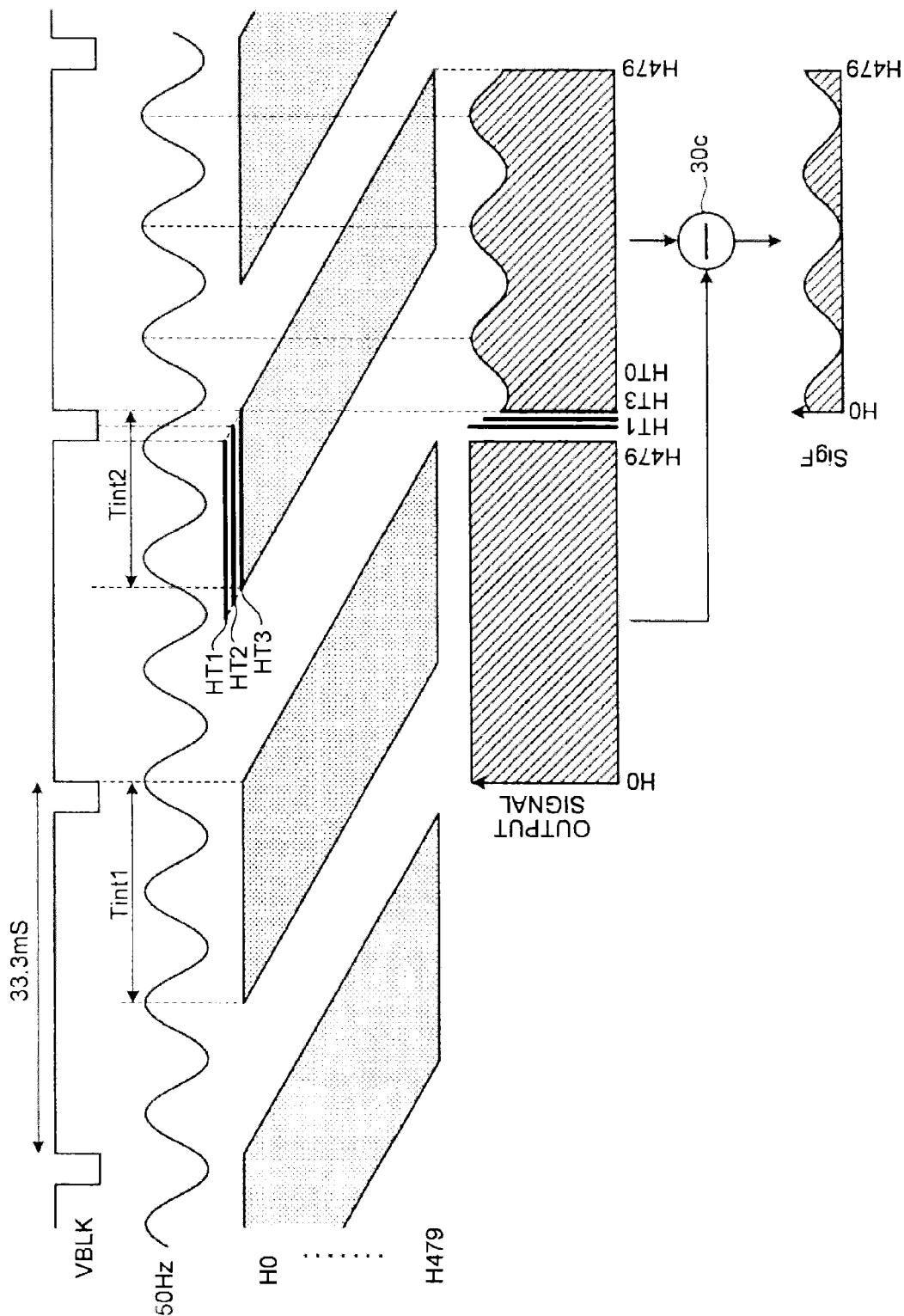
FIG. 21 is a diagram for explaining a flicker detecting method for the solid-state imaging device shown in FIG. 20.

FIG. 21 is a diagram of a flicker detecting method for the solid-state imaging device shown in FIG. 20.

In FIG. 21, when it is assumed that a flicker frequency is 50 hertz, the accumulation time Tint1 of the first frame is set to be n/100 (n is a positive integer). In this case, a flicker component included in the output signal OUT1 is cancelled.

Subsequently, the accumulation time Tint2 for the next frame is set to time other than n/100 second. In this case, the output signal OUT1 is output without the flicker component being cancelled. At this point, the output signal OUT1 obtained in the accumulation time Tint2 is amplified to be a signal level same as that of the output signal OUT1 obtained in the accumulation time Tint1.

For example, when the accumulation time Tint2 is shorter than the accumulation time Tint1, the output signal OUT1 obtained in the accumulation time Tint2 is amplified at a ratio of GAIN=Tint1/Tint2. When the output signal OUT1 obtained in the accumulation time Tint2 is amplified to be a signal level same as that of the output signal OUT1 obtained in the accumulation time Tint1, a difference image signal SigF between a flicker image signal and an un-flickered image signal is generated by calculating a difference between signals added up and averaged in the horizontal direction. The difference image signal SigF can be given as SigF=SigTint1−(Tint1/Tint2)*SinTint2. Sigtint1 represents a signal obtained by adding up and averaging, in the horizontal direction, the output signal OUT1 obtained in the accumulation time T1. SigTint2 represents a signal obtained by adding up and averaging, in the horizontal direction, the output signal OUT1 obtained in the accumulation time Tint2.

The flicker level GainFmax can be calculated as GainFmax=SigTint1/SigTint2*(Tint1/Tint2) by referring to the difference image signal SigF. A position of a maximum signal level of the difference image signal SigF at this point is LINSmin. A position of a minimum signal level of the difference image signal SigF is LINSmax. The time TFs to the output of the next frame can be calculated from these results.

Consequently, even when a subject has light and shade, it is possible to improve calculation accuracy for the maximum signal amount Smax and the minimum signal amount Smin and suppress a flicker without reducing a signal amount.

In the embodiment shown in FIG. 20, as in the embodiment shown in FIG. 16, presence or absence of a fluorescent lamp flicker and a frequency of 50 hertz or 60 hertz by comparing the averages of the signals of the test lines HT1 to HT3. In the embodiment shown in FIG. 20, the method of providing the test lines HT1 to HT3 on the outside of the valid area is explained. However, the test lines HT1 to HT3 do not have to be provided.

Figure 22:
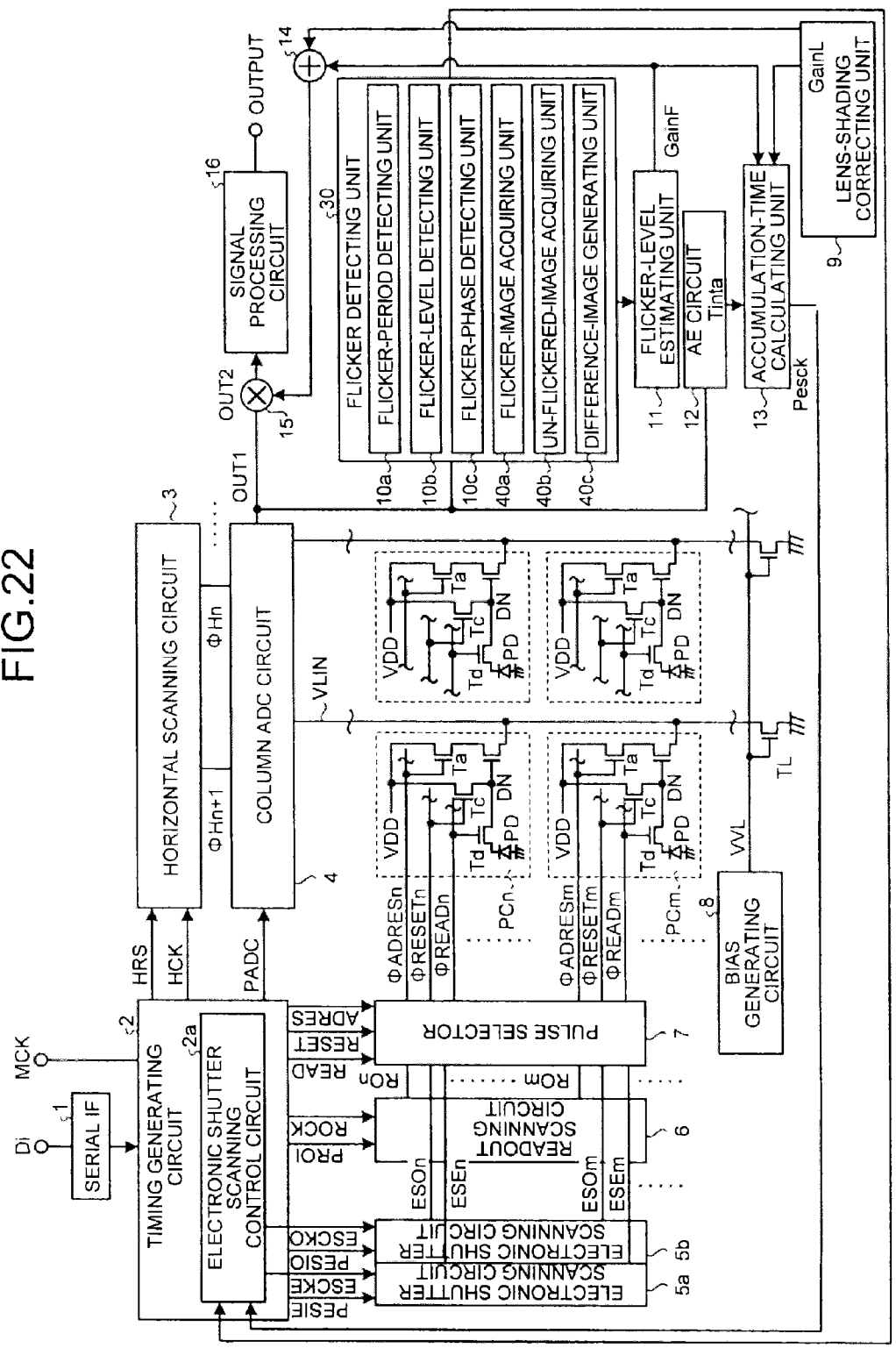
FIG. 22 is a block diagram of the schematic configuration of a solid-state imaging device according to a fourth embodiment.

FIG. 22 is a block diagram of the schematic configuration of a solid-state imaging device according to a fourth embodiment.

In FIG. 22, the solid-state imaging device includes a flicker detecting unit 40 and electronic shutter scanning circuits 5a and 5b instead of the flicker detecting unit 10 and the electronic shutter scanning circuit 5 shown in FIG. 1. The flicker detecting unit 40 includes a flicker-image acquiring unit 40a, an un-flickered-image acquiring unit 40b, and a difference calculating unit 40c in addition to the components of the flicker detecting unit 10. In the solid-state imaging device, as shown in FIG. 17, the test lines HT1 to HT3 for minimum three lines are provided on the outside of the valid area.

The flicker-image acquiring unit 40a can acquire a flicker image signal of odd number lines in one frame set in accumulation time in which a flicker occurs. The un-flickered-image acquiring unit 40b can acquire an un-flickered image signal of even number lines in one frame set in accumulation time in which no flicker occurs. The difference-image generating unit 40c can generate a difference image between a flicker image signal and an un-flickered image signal after correcting a level difference due to a difference between the accumulation times. This difference signal generation can be performed by using data of an average in the horizontal direction of the lines of the images.

The electronic-shutter scanning circuit 5a can perform electronic shutter scanning for each of the odd number lines. The electronic-shutter scanning circuit 5a can include a shift register that controls the odd number lines. The electronic shutter scanning circuit 5b can perform electronic shutter scanning for each of the even number lines. The electronic shutter scanning circuit 5b can include a shift register that controls the even number lines.

Accumulation start signals ESEn and ESEm of the odd number lines and accumulation start signals ESOn and ESOm of the even number lines are alternately switched and output from the electronic shutter scanning circuits 5a and 5b. Timing control signals PESIE and ESCKE are input to the electronic shutter scanning circuit 5a. Timing control signals PESIO and ESCKO are input to the electronic shutter scanning circuit 5b.

When a flicker is detected, the accumulation time Tint1 for the odd number lines in one frame is set such that a flicker can be detected by the flicker-image acquiring unit 40a. The output signal OUT1 of the odd number lines in one frame is acquired. Subsequently, the accumulation time Tint2 for the even number lines in one frame is set such that the flicker is cancelled by the un-flickered-image acquiring unit 40b. The output signal OUT1 in the even number lines in one frame is acquired. The difference-image generating unit 40c generates a difference image signal between the flicker image signal and the un-flickered image signal after correcting a level difference due to a difference between the accumulation times Tint1 and Tint2.

The flicker-period detecting unit 10a detects the flicker period LinF referring to the difference image signal generated by the difference-image generating unit 40c. The flicker-level detecting unit 10b detects the flicker level GainFmax. The flicker-phase detecting unit 10c detects the time TFs from a line in which a signal amount is minimum or maximum to a readout line of the next frame and outputs the time TFs to the flicker-level estimating unit 11.

The flicker-level estimating unit 11 estimates, based on the flicker period LinF, the flicker level GainFmax, and the time TFs to the readout line of the next frame, the flicker correction gain GainF of the lines of the next frame.

This flicker detection can be automatically performed during the start of imaging, can be periodically performed during operation of the solid-state imaging device, or can be forcibly performed according to an instruction from the outside.

Figure 23:
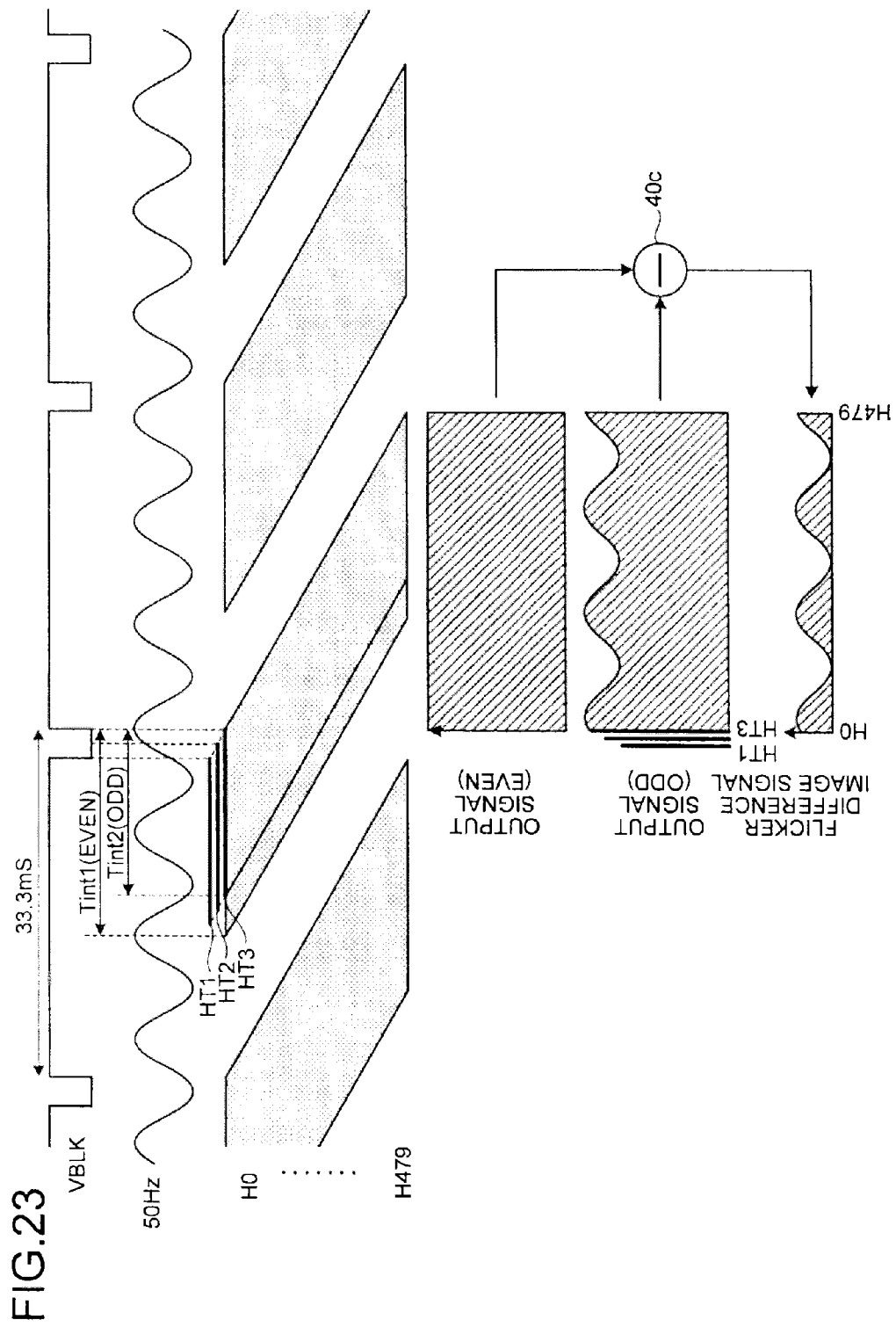
FIG. 23 is a diagram for explaining a flicker detecting method for the solid-state imaging device shown in FIG. 22.

FIG. 23 is a diagram for explaining a flicker detecting method for the solid-state imaging device shown in FIG. 22.

In FIG. 23, the accumulation times Tint1 and Tint2 are set such that a flicker of the output signal OUT1 is cancelled in the odd number lines in one frame and the flicker of the output signal OUT1 is not cancelled in the even number lines in one frame. In the output signal OUT1 at this point, a color sensor can extract only a G signal in the case of the Bayer array and carry out addition and averaging in the horizontal direction.

Consequently, it is unnecessary to store an average in the vertical direction for one frame to generate a difference signal between a flicker image signal and an un-flickered image signal. A circuit size can be reduced. Processing time only has to be time for one frame. Processing can be executed in a short time. This method is applicable to 50 hertz or 60 hertz. Specifically, a flicker like a lateral stripe occurs in a fixed position at 60 hertz. In this processing, this flicker can also be detected.

In actual photographing, because an environment of a subject changes, accumulation time is changed and a flicker amount changes. It is necessary to detect the flicker amount and change the flicker correction gain GainF. As a flicker at 60 hertz, a lateral stripe occurs in a fixed position as shown in FIG. 18. Therefore, the flicker correction gain GainF calculated in the processing shown in FIG. 21 or FIG. 23 and a signal ratio of the test signal Sight and Sight3 of the test lines HT2 and HT3 are calculated. The clicker correction gain GainF can be caused to follow a change in the flicker amount by changing the flicker correction gain GainF according to the signal ratio of the test signals Sight and Sight3 of the test lines HT2 and HT3.

On the other hand, in the case of a flicker at 50 hertz, as shown in FIG. 18, the flicker repeatedly changes in a three-frame period. Therefore, a signal in the position of the line number LINSmin extracted in the processing in FIG. 21 or FIG. 23 can be subjected to addition and averaging processing in the horizontal direction, a ratio of a signal amount at the time of a flicker in a minimum signal and a signal amount of the next frame can be measured, and a value 1.33 times as large as the ratio can be set as the flicker correction gain GainF. When the amplitude of a SIN signal changes from 0 to 1, if a phase of the SIN signal shifts by 120 degrees (or 240 degrees), the amplitude is 0.75 times as large as the amplitude 0. A maximum signal amount is 1/0.75=1.33. The flicker correction gain GainF can be caused to follow a change in the flicker amount by using this result as the flicker correction gain GainF.

In the embodiment shown in FIG. 22, as in the embodiment shown in FIG. 16, presence or absence of a fluorescent lamp flicker and a frequency of 50 hertz or 60 hertz can be detected by comparing averages of signals of the test lines HT1 to HT3. In the embodiment shown in FIG. 22, the method of providing the test lines HT1 to HT3 on the outside of the valid area is explained. However, the test lines HT1 to HT3 do not have to be provided.

Figure 24A:
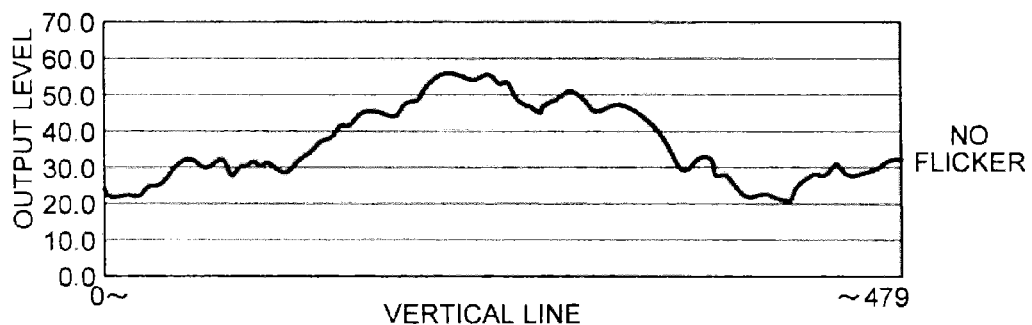
FIGS. 24A to 24C are graphs of flicker levels detected by the solid-state imaging device shown in FIG. 22.
Figure 24B:
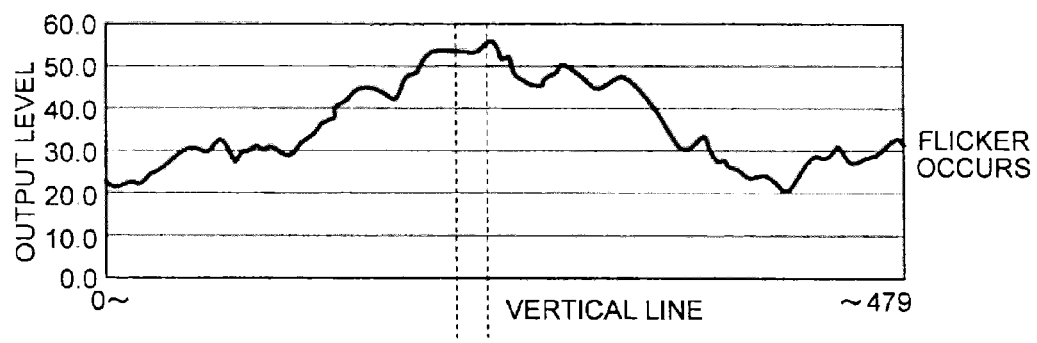
Figure 24C:
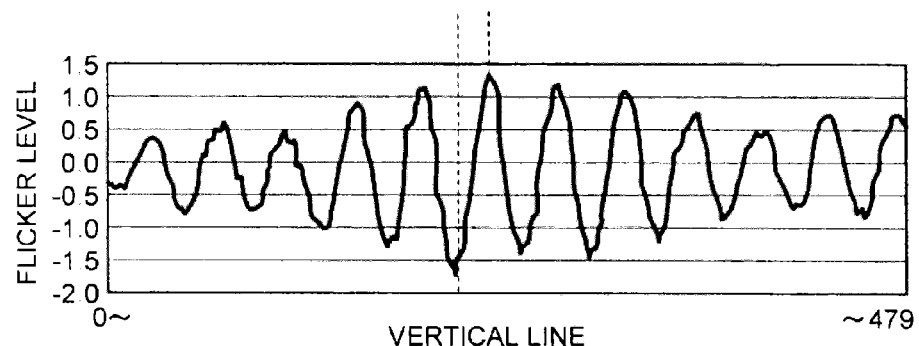

FIGS. 24A to 24C are graphs of flicker levels detected by the solid-state imaging device shown in FIG. 22.

In FIG. 24B, when the solid-state imaging device is caused to operate at 7.5 hertz and an image of a subject having light and shade is picked up, even if a flicker occurs in the output image OUT1, it cannot be determined that the flicker is present. Only a flicker component of a sine wave can be extracted as shown in FIG. 24C by calculating a difference between the output signal OUT1 and a signal without a flicker shown in FIG. 24A obtained in the processing shown in FIG. 21 or FIG. 23. The flicker level GainFmax can be calculated as GainFmax=55.7/(55.7−2.8)=1.05 from a difference between a minimum or maximum output level at this point and a flicker level obtained in the difference calculation. A phase of the flicker can also be detected from a difference image between a flicker image signal and an un-flickered image signal.

In the embodiment, the method in which one pixel-one cell includes one photodiode PD and four transistors is explained. However, the present invention can be applied to a two pixel-one cell configuration and a four pixel-one cell configuration and can be applied to a cell not including the row selection transistor Ta. The present invention can be applied to a solid-state imaging device of an XY address scanning type such as a MOS type rather than the CMOS type and can be applied to a CCD imager.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   a pixel unit in which pixels are arranged in a matrix shape;
   an electronic shutter scanning control unit that controls accumulation time of the pixel unit to be different with respect to each line in a frame;
   a flicker detecting unit that detects, based on a magnitude relation of a signal amount in each of lines formed in the pixel unit with respect to an image signal of one frame picked up by the pixel unit, presence or absence of a flicker;
   a flicker-level estimating unit that estimates, based on the presence or absence of the flicker detected by the flicker detecting unit, a flicker level in each of the lines of a next frame; and
   a flicker correcting unit that corrects, based on the flicker level estimated by the flicker-level estimating unit, for each of the lines, a flicker that occurs in a signal of an image picked up by the pixel unit, wherein the flicker detecting unit includes a flicker-signal acquiring unit that acquires a flicker signal with respect to an image signal whose accumulation time is controlled such that a flicker occurs in only one of an odd number line or an even number line, an un-flicker signal acquiring unit that acquires an un-flickered signal with respect to an image signal where accumulation time is controlled such that a flicker does not occur in only the other of the odd number line and the even number line, and a difference-signal generating unit that generates a difference signal between the flicker signal and the un-flickered signal after correcting a level difference due to a difference between accumulation times.

2. The solid-state imaging device according to claim 1, wherein the flicker detecting unit includes:
   a flicker-level detecting unit that detects a flicker level based on a difference signal for each of adjacent lines different from the accumulation time,
   a flicker-period detecting unit that detects, based on an interval between lines in a position where the signal amount of the difference signal is minimum and a position where the signal amount is maximum, a flicker period, and
   a flicker-phase calculating unit that calculates, based on an interval from a predetermined position of the flicker signal detected by the flicker-period detection to a next frame, a flicker phase.

3. The solid-state imaging device according to claim 2, wherein the flicker-level estimating unit estimates, based on the flicker period, the flicker level, and the time to the readout line of the next frame, a flicker correction gain of the lines of the next frame.

4. The solid-state imaging device according to claim 2, wherein the flicker detecting unit determines, based on a result of determination whether the interval between the lines in the position where the signal amount for each of the lines is minimum and the position where the signal amount is maximum corresponds to an assumed flicker period, presence or absence of a flicker.

5. The solid-state imaging device according to claim 1, wherein the flicker correcting unit includes a gain control unit that controls, based on the flicker level estimated by the flicker-level estimating unit, for each of the lines, a gain of a signal read out from the pixels.

6. The solid-state imaging device according to claim 5, further comprising:
   a lens-shading correcting unit that corrects lens shading.

7. The solid-state imaging device according to claim 6, further comprising:
   an adder that adds up flicker level calculated by the flicker-level estimating unit and a shading correction coefficient output from the lens-shading correcting unit.

8. The solid-state imaging device according to claim 7, further comprising:
   a multiplier that multiplies, for each of the lines an image signal picked up by the pixel unit with an output of the adder.

9. The solid-state imaging device according to claim 8, further comprising:
   a column ADC circuit that performs CDS processing and AD conversion processing for the image signal read out from the pixel unit.

10. The solid-state imaging device according to claim 1, wherein the flicker correcting unit includes an accumulation-time calculating unit that calculates, based on the flicker level estimated by the flicker-level estimating unit, for each of the lines, accumulation time for the pixels.

11. The solid-state imaging device according to claim 10, further comprising:
   an electronic shutter scanning control circuit that controls, based on an accumulation time control signal calculated from the accumulation time calculating unit, an accumulation start signal.

12. The solid-state imaging device according to claim 11, further comprising:
   a pulse selector that generates, based on the accumulation start signal, a readout signal, a reset signal, and outputs the readout signal, the reset signal, and the row selection signal to the pixels.

13. The solid-state imaging device according to claim 12, wherein the pixel unit includes:
   a photodiode that performs photoelectric conversion,
   a reset transistor that resets, based on the reset signal, a signal accumulated in a detection node, a readout transistor that reads out, based on the readout signal, a signal from the photodiode to the detection node, and an amplification transistor that amplifies the signal read out from the photodiode to the detection node.

* * * * *